(12) United States Patent
McBrayer et al.

(10) Patent No.: US 7,499,871 B1
(45) Date of Patent: Mar. 3, 2009

(54) SYSTEM AND METHOD FOR PROCUREMENT OF PRODUCTS

(75) Inventors: Byron L. McBrayer, East Liberty, OH (US); Diana New, Sidney, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1014 days.

(21) Appl. No.: 10/151,370

(22) Filed: May 20, 2002

(51) Int. Cl.
*G06Q 10/00* (2006.01)

(52) U.S. Cl. .................... 705/11; 705/7; 705/8; 705/10

(58) Field of Classification Search ............ 705/11
See application file for complete search history.

(56) References Cited

U.S. PATENT DOCUMENTS

| | | | | |
|---|---|---|---|---|
| 5,765,138 | A * | 6/1998 | Aycock et al. | 705/7 |
| 5,940,807 | A | 8/1999 | Purcell | 705/26 |
| 5,970,475 | A | 10/1999 | Barnes et al. | 705/27 |
| 6,055,516 | A * | 4/2000 | Johnson et al. | 705/27 |
| 6,088,678 | A * | 7/2000 | Shannon | 705/8 |
| 6,088,679 | A * | 7/2000 | Barkley | 705/8 |
| 6,161,099 | A | 12/2000 | Harrington et al. | 705/37 |
| 6,226,675 | B1 | 5/2001 | Meltzer et al. | 709/223 |
| 6,604,084 | B1 * | 8/2003 | Powers et al. | 705/11 |
| 6,647,374 | B2 * | 11/2003 | Kansal | 705/37 |
| 6,990,465 | B1 * | 1/2006 | Wandmacher et al. | 705/26 |
| 7,010,496 | B2 * | 3/2006 | Wong | 705/10 |
| 7,047,208 | B1 * | 5/2006 | Nelson et al. | 705/10 |
| 2002/0035450 | A1 * | 3/2002 | Thackston | 703/1 |
| 2002/0052807 | A1 * | 5/2002 | Han et al. | 705/27 |
| 2002/0052862 | A1 * | 5/2002 | Scott et al. | 707/1 |
| 2002/0065736 | A1 * | 5/2002 | Willner et al. | 705/26 |
| 2002/0091536 | A1 * | 7/2002 | Seaman et al. | 705/1 |
| 2002/0107713 | A1 * | 8/2002 | Hawkins | 705/8 |
| 2002/0107723 | A1 * | 8/2002 | Benjamin et al. | 705/11 |
| 2003/0009366 | A1 * | 1/2003 | Haber et al. | 705/9 |
| 2003/0187763 | A1 * | 10/2003 | Jordan et al. | 705/35 |
| 2004/0015391 | A1 * | 1/2004 | Dupreez et al. | 705/11 |
| 2004/0215467 | A1 * | 10/2004 | Coffman et al. | 705/1 |
| 2005/0228703 | A1 * | 10/2005 | Eichstaedt et al. | 705/7 |

OTHER PUBLICATIONS

Petroni et al, Vendor Selection using prinicipal component analysis, Spring 2000, Journal of Supply Chain Management, v36n2, pp. 63-69 [File 15, dialog].*

Jayaraman et al, Supplier selection and order quantity allocation: A comprehensive model, Spring 1999, Journal of Supply Chain Management, v35n2, pp. 50-58 [file 15 dialog].*

* cited by examiner

*Primary Examiner*—Andre Boyce
(74) *Attorney, Agent, or Firm*—Standley Law Group LLP

(57) ABSTRACT

A system and method for procurement of engineered-to-order products that facilitates the workflow management for buyers is disclosed. The present invention comprises a buyer's workbench (BWB) that operates in conjunction with a web-based marketplace application for suppliers and an enterprise resource planning system (ERP) that links together a company's operations. The BWB facilitates the workflow management for buyers by allowing them to review purchasing requirements and to obtain an optimal procurement strategy. Supplier performance data is tracked through the ERP system and is a factor in determining the total cost of buying products from a particular supplier. The web-based marketplace application for suppliers comprises an interface that allows suppliers to review and collect information about opportunities to fulfill orders for engineered-to-order products. They may review information regarding current and past purchase order activity with the company, current quality and delivery information on their own companies and their peers.

14 Claims, 28 Drawing Sheets

| Purchase Order Release | | | | | | | | |
|---|---|---|---|---|---|---|---|---|
| 1 Workflow | 2 PO | 3 Addr/Note | 4 Line Items | 5 Detail | 6 Detail 2 | 7 History | 8 RFQ | |

330

- Add Row:
- PO Li#:
- PO Req#:
- Req Li#:
- Poreq Date:
- Quote #:
- Quote Li#:
- Order Type:
- Requestor:
- Deliver To:
- G/L Acct#:

- Part Number
- Description:
- Supplier:
- Reqd Dates:
- Sched Date:
- Chg Code:
- Whse:
- Project:
- Work Order:
- Inv. Loc:
- Resource:

- Part Rev:
- Part Hold:
- PO Hold:
- Tax Type:
- U/M:
- U/M Factor:
- Request Qty:
- Sched Qty:
- Balance Due:
- Unit Price:
- Price Per:
- Price Conv.
- Ext. Price:
- Foreign:

FIG-4

| Purchase Order Release | | | | | | | | _ □ ×|
|---|---|---|---|---|---|---|---|---|
| 1 Workflow | 2 PO | 3 Addr/Note | 4 Line Items | 5 Detail | 6 Detail 2 | 7 History | 8 RFQ | |

340

Material Furnished:
Supply Parts: ☐
OP Location: ▽
Parts to Supply

AML

Receipts

☐ Print Line
☐ Inspect
☐ Netting

Ship Id:
Ship Li#:
Early Days:
Overship%:
A/P Acct#:

PO Notes:

Change Notes:

Note Numbers:

Custom Fields:
Prompt | Entry

Locate a Supplier

Search Criteria: — 364

Supplier Name: [        ]  Buyer: [       ▽]  [Find]

Categories: [(All)    ] [...]  [Select]

| | Code | Name | Q & D Rating | Level | Phone | Contact | Address | Notes |
|---|---|---|---|---|---|---|---|---|
| 1 | 1343 | Accurate Castings, Inc | | | 714-665-1600 | Nguyen Thu | 4500 Bristol Ave Sa | |
| 2 | 1347 | Acme Maintenance Se | | | 213-760-9150 | Bob Casey | 9120 Brookhurst No | |
| 3 | 1345 | Acme Nameplates (R) | | | 405-566-2700 | Betty Souri | 650 Williams Street | |
| 4 | 1340 | Ajax Fasteners | | | 213-326-7250 | John Rumple | 13400 Studebaker D | |
| 5 | 2 | Ampex Fasteners Inc. | | | 213-765-5678 | Steve Lommer | 3125 South St Suite | |
| 6 | 3 | Armen Supply Comp. | | | 213-772-3888 | Al Harper | 2100 Main Street La | |
| 7 | 4 | B.D.P. Corp. | | | 303-530-4000 | Larry Gold | 1 Corporate HQ Pla | |
| 8 | 1335 | Bearing Specialties | | | 212-245-1000 | Juanita Rami | 2179 Valley View Ne | |
| 9 | 1339 | Belker Spring Corp. | | | 415-582-1400 | Juan Fernand | 19700 Wilmington Sq | |
| 10 | 110 | Beverly Armstrong | | | | | 256 King River S.E. | |
| 11 | 120 | Bill F. Harkonnan | | | | | 556 Rolling Rock La | |
| 12 | 1337 | Castle Metals | | | 303-444-4258 | S. Broderick | 4600 Springdale Der | |
| 13 | 5 | Compufact | | | 714-891-6336 | L. Bradmen | 7441 Lincoln Way S | |
| 14 | 1349 | County Diecasting | | | 714-659-1800 | John Fulerto | 1256 W. 19th Street | |
| 15 | 6 | Deveco Metal Prod. | | | 805-789-3323 | Mark Jones | 13771 Talisman Way | |
| 16 | 150 | Diane Harrison | | | | | 339 Pleasant Court | |

FIG—8

| Type | Date | DOC# | Li# | Vendor Number | Vendor Name | Qty Ordered | Qty Received | Unit Price | Resource | Line Notes | Change Notes |
|---|---|---|---|---|---|---|---|---|---|---|---|
| PO | 10/20/01 | 156 | 1 | 6 | Deveco Metal Products | 1.00 | 0.00 | 2345.6700 | MTL | Get off | |
| PO | 10/19/01 | 138 | 3 | 1 | Perfect Products | 1.00 | 0.00 | 2345.6700 | MTL | | |
| PO | 10/19/01 | 160 | 1 | 15 | Ratheon Tubes | 1.00 | 0.00 | 2500.0000 | MTL | | |
| PO | 10/01/01 | 155 | 2 | 2 | Ampex Fasteners Inc. | 30.00 | 0.00 | 2450.0000 | MTL | These | |
| PO | 10/01/01 | 155 | 1 | 2 | Ampex Fasteners Inc. | 12.00 | 2.00 | 2500.0000 | MTL | | These |
| PO | 09/20/01 | 166 | 1 | 1 | Perfect Products | 1.00 | 0.00 | 25.0000 | MTL | | |
| PO | 09/01/01 | 153 | 1 | 1 | Perfect Products | 1.00 | 1.00 | 2500.0000 | MTL | | |
| PO | 09/01/01 | 152 | 1 | 2 | Ampex Fasteners Inc. | 1.00 | 1.00 | 2500.0000 | MTL | | |
| PO | 08/15/01 | 151 | 1 | 2 | Ampex Fasteners Inc. | 1.00 | 0.00 | 4567.0000 | MTL | | |
| PO | 05/28/01 | 168 | 2 | 3 | Armen Supply Company | 1.00 | 0.00 | 2345.6700 | MTL | Get off | |
| PO | 05/28/01 | 158 | 2 | 1 | Perfect Products | 1.00 | 0.00 | 2345.6700 | MTL | Get off | |

FIG-9

Locate a Purchase Order

Search Criteria:

- ☑ From Date: 10/01/01
- ☑ To Date: 10/31/01
- ☑ Due By: 10/31/01

Supplier(s): 1305, 1478 ...
Warehouse: W1=Smith Supp ▽
Buyer: BRS= Joe Smith ▽

- ☑ Open Orders
- ☐ Closed Orders
- ☐ Only PO's on Hold
- ☐ Only Late PO's

[Find] [Open]

| Date | PO# | Supplier ID | Supplier Name | Whse | Status | Buyer | Next Due Date | On Hold | Late |
|------|-----|-------------|---------------|------|--------|-------|---------------|---------|------|

Locate a Request for Quote

Search Criteria:
- Supplier(s): [...]
- Warehouse: W1=Smith Supp ▽
- Buyer: BRS= Joe Smith ▽
- Categories: (All) [...]

☑ Open RFQs  ☑ Auction  ☑ From Date: 01/01/01
☑ Pending Award  ☑ Sealed Bid  ☑ To Date: 10/31/01
☐ Closed RFQs  ☑ Manual

[Find] [Open]

| | Date | RFQ# | Description | Categories | Whse | Buyer | RFQ Type | RFQ Status | Date Open | Open Time | Close Date | Close Time | Duration |
|---|---|---|---|---|---|---|---|---|---|---|---|---|---|
| 1 | 01/01/01 | 25874 | Machining | MP | W1 | PC | Auction | Closed | 01/04/01 | 08:00am | 01/05/01 | 05:00pm | 1 day+9 hrs |
| 2 | 09/15/01 | 29874 | Lathe Work | LP | W2 | MAC | Manual | Pending | 09/28/01 | 12:00pm | 09/28/01 | 05:00pm | 5 hrs |
| 3 | 10/10/01 | 34568 | Weldments | SW, MW | W3 | GLC | Sealed | Open | 10/10/01 | 08:00am | 10/12/01 | 05:00pm | 2 days+9 hrs |

| Supplier Maintenance | | | | | □ ☒ |
|---|---|---|---|---|---|
| Supplier | Profile | Notes/Doc's | Accts Payable | QCD | Bid History |

Supplier Id: NCC
Company Name: Northwest Computing, Inc.
Address (1): 1234 North Creek Road
Address (2): PMB #301
Address (3): Oregon City, OR
Address (4): 97045
Sort City: Oregon City
Sort State: AL = Alabama ▽
Sort Zip: 97045

Buyer: BRS
F.O.B.: Destination
Ship Via: Best Way
Primary Contact: Jane Smith
E-mail Address: jsmith@ncc.com
Phone Numbers: 101-234-5678
Fax Number: 101-234-5679

| | Name | Title | Phone Number | Ext. | Fax Number | E-mail Address | Notes |
|---|---|---|---|---|---|---|---|
| 1 | Jane Smith | Systems Analyst | 101-234-5678 | | 101-234-5679 | jsmith@ncc.com | |
| 2 | | | | | | | |

FIG-12

Supplier Maintenance

| Supplier | Profile | Notes/Doc's | Accts Payable | QCD | Bid History |

PO Notes: These are notes to be printed on the Header of all PO's for this supplier.

Internal Notes: This is the existing internal notes field.

Dated Notes:

| | Entered By | Entered Date | Expires Date | Note |
|---|---|---|---|---|
| 1 | BRS | 05/30/01 | 06/15/01 | Lead Mechanic on Vacation |
| 2 | | | | |

Documents:

| | Description | File Name | Required? | Date Signed | Verified By |
|---|---|---|---|---|---|
| 1 | Confidentiality | CDNF.PDF | ☑ | 04/15/01 | BRS |
| 2 | Safety Sign-Off | SAFE.PDF | ☑ | 05/28/01 | BRS |
| 3 | Contract Conditions | CONTRACT.PDF | ☑ | 10/19/01 | BRS |

Supplier Maintenance

Supplier | Profile | Notes/Doc's | Accts Payable | QCD | Bid History

- Remit To: NCC
- A/P Contact: Jane Smith
- A/P Phone: 101-234-5678
- Terms Code: A=Collect on Deliv
- Days to Pay: 10
- Credit Limit:
- A/P Notes:

- Tax Codes: CA, LA-RTD
- Taxpayer Id:
- Currency: (None)
- Check Code:
- 1099 Required: ☐
- 1099 Sales: ☐
- Backup Withholding: ☐
- 1099 Code:
- Inactive: ☐
- Remit-To Only: ☐

FIG-15

Supplier Maintenance

| Supplier | Profile | Notes/Doc's | Accts Payable | QCD | Bid History |

Search Criteria:
Categories: (All) ▽ ... From Date: 10/03/01 ▽ To Date: 10/03/01 ▽ [Search]

| | RFQ# | Description | Bid Type | Close Date | Q & D Used | Supplier's Bid Amount | Supplier's Weighted | Winner's Q & D | Winner's Bid Amount | Winner's Weighted | Bid Variance | Weighted Variance | Supplier Wins |
|---|---|---|---|---|---|---|---|---|---|---|---|---|---|
| 1 | 12345 | Machining | Auction | 05/28/01 | 98.00% | 100.00 | 102.04 | 98.00% | 100.00 | 102.04 | 0.00 | 0.00 | ☑ |
| 2 | 85214 | Weldments | Sealed | 10/19/00 | 96.00% | 100.00 | 104.17 | 97.00% | 100.00 | 103.09 | 0.00 | 1.08 | ☐ |

420

Summary
Number of Bids: 999   Number Won: 999   Total Bid: $999,999.99   Total Won: $999,999.99   999.99%

FIG-17

Supplier Requests

Search | Profile Change | Information

Search Criteria:

Request #: ☐  
Supplier(s): ☐ ...  
Buyer: S= Joe Smith ▽

☐ From Date: 10/03/01 ▽  
☐ To Date: 10/03/01 ▽

☑ Open Requests  
☑ Closed Requests  
☑ Profile Changes  
☑ Info Requests

[Find] [Open]

| | Request Number | Date | Supplier Id | Supplier Name | Request Type | RFQ# | Status | Buyer |
|---|---|---|---|---|---|---|---|---|
| 1 | 1001 | 05/30/01 | 2587 | Perfect Products | Profile Change | | Denied | PC |
| 2 | 1027 | 06/05/01 | 2587 | Perfect Products | Profile Change | | Closed | PC |
| 3 | 2503 | 09/01/01 | 1038 | Matthew's Machining | Information | 25874 | Open | GLC |

FIG-18

Supplier Requests

Search | Profile Change | Information

Request #: 2503　　Date: MM/DD/YY　　RFQ#: 25874　　Supplier: Perfect Products, Inc.

Question:

Answer:

☑ Make Public　☑ Email This Supplier　☑ Email All Suppliers on This RFQ　　Submit Answer

Supplier Requests

Search | Profile Change | Information

Request #: 1001    Request Date: MM/DD/YY    [Accept] [Reject]

| | Name | Current Value | Supplier's Entry | New Value |
|---|---|---|---|---|
| 1 | Company Name | Perfect Products, Inc. | Perfect Products, Inc. | Perfect Products, Inc. |
| 2 | Full Address | 123 Easy Street Oregon City, OR 97045 | 123 Easy Street Oregon City, OR 97045 | 123 Easy Street Oregon City, OR 97045 |
| 3 | City | Oregon City | Oregon City | Oregon City |
| 4 | State | Oregon | Oregon | Oregon |
| 5 | Zip | 97045 | 97045 | 97045 |
| 6 | Company Description | Manufacturer of Perfect Stuff | Manufacturer of Perfect Stuff | Manufacturer of Perfect Stuff |
| 7 | Contact Name | Matthew Bradley | Matthew Bradley | Matthew Bradley |
| 8 | Contact Title | Sales Associate | Sales Associate | Sales Associate |
| 9 | Contact Phone# | 503-632-5671 | 503-632-5671 | 503-632-5671 |
| 10 | Contact Alt. Phone# | 503-632-6547 | 503-632-6547 | 503-632-6547 |
| 11 | Fax Number | 503-632-5688 | 503-632-5688 | 503-632-5688 |
| 12 | Email Address | Info@PerfectProducts.com | Info@PerfectProducts.com | Info@PerfectProducts.com |
| 13 | Send PO Via | Email | Email | Email |
| 14 | Send RFQ Via | Email | Email | Email |
| 15 | Send Win/Loss Via | Web | Web | Web |
| 16 | Sq. Feet | 60,000 | 150,000 | 150,000 |
| 17 | Public Company | ☑ | | |
| 18 | Union Shop | ☑ | | ☑ |
| 19 | Annual Sales | 25,000,000 | 25,000,000 | 25,000,000 |
| 20 | Equipment | All weldment sizes | All weldment sizes | All weldment sizes | eMarketPlace

Open RFQs – Full Use Industries

Color Legend: [Open RFQs] [RFQs in Blackout] [Pending RFQs]

[Main Menu]

| RFQ Number | Description | Type | Date Opened | Scheduled Close | Blackout Start | Time Remaining Until Close | Current Quote | Current Weighted | Lowest Quote | Lowest Weighted |
|---|---|---|---|---|---|---|---|---|---|---|
| 1234567 | First description for an "in Blackout" (s/b yellow) | Auction | 08:00 10/4/01 | 22:00 10/4/01 | 21:00 10/4/01 | 01:59:35 | | | 500.00 | 510.00 |
| 2345678 | Another description (for a sealed bid) | Sealed Bid | 10:00 10/5/01 | 17:00 10/6/01 | | | 250.00 | 275.00 | | |
| 3456789 | Another description for an "in Blackout" (s/b yellow) | Auction | 18:00 10/6/01 | 15:30 10/7/01 | 12:30 10/7/01 | | 1,200.00 | 1,100.00 | 1,500.00 | 1,050.00 |
| 4567890 | Description for an Open (s/b green) | Auction | 09:00 10/7/01 | 12:00 10/7/01 | 11:00 10/7/01 | | | | 45.00 | 50.00 |
| 5678901 | Description for a Pending (s/b purple) | Auction | 11:00 10/1/01 | 16:00 10/1/01 | 15:00 10/1/01 | | 100.00 | 120.00 | 150.00 | 145.00 |

FIG-22 eMarketPlace
Open RFQ 12345678 – Full Use Industries

| Main Menu | Return to Open RFQ List | | |
|---|---|---|---|
| Type: | Auction | Job Number: | 1234–5678 |
| Open Date: | 08:00 10/4/01 | Status: | In Blackout |
| Scheduled Close Date: | 22:00 10/4/01 | Blackout Start: | 21:00 10/04/01 |
| Current Quote: | 0.00 | Time Remaining Until Close: | 02:01:18 |
| Current Weighted: | 0.00 | Designer: | B. A. Designer |
| Buyer: | J. D. Buyer | Delivery Location: | Warehouse A |
| Buyer Phone: | (976) 555-2001 | | |

Description: Exterior parts

Special Instructions: Do not use corrosive materials

| Part Number | Description | Category Code | Requested Date | Promise Date | Quantity | Price | Drawings |
|---|---|---|---|---|---|---|---|
| PN-12345 | First description for a Part. | LW | 10/04/01 | 10/3/01 | 1 | 50.00 | View |
| PN-23456 | Description for another Part. | MW | 10/04/01 | 10/3/01 | 1 | 500.00 | |
| PN-34567 | Another description for a Part. | SW | 10/04/01 | 10/3/01 | 1 | 5,000.00 | View |
| PN-45678 | Another description for a Part. | WC | 10/04/01 | 10/3/01 | 1 | 50.00 | View |

Submit  Ask a Question  View Questions and Answers

Ask a Question

RFQ 12345678 - Ask a Question

Send Question   Close

Ask a Question

Questions and Answers

Question #7, 14:25 10/08/01, A. Suppler:
Do you have a chemical resistance requirement for Part 23456?
Reply to Question #7, 8:15 10/09/01, A. Suppler:
Yes, they should definitely resist corrosive chemicals.

| Ex. 1 | | Performance Quotient | | 570 |
|---|---|---|---|---|
| | Bid | Quality | Delivery | Buy Recomendation |
| PDQ | 100 | 48 | 50 | 98.00 |
| ABC | 100 | 50 | 50 | 100.00 |
| XYZ | 100 | 52 | 56 | 108.00 |
| IRS | 100 | 65 | 50 | 115.00 |
| ACME | 100 | 60 | 60 | 120.00 |
| | | | | |
| Ex. 2 | | Performance Quotient | | |
| | Bid | Quality | Delivery | Buy Recomendation |
| ABC | 125 | 50 | 50 | 125.00 |
| IRS | 110 | 65 | 50 | 126.50 |
| PDQ | 131 | 48 | 50 | 128.38 |
| ACME | 111 | 60 | 60 | 133.20 |
| XYZ | 130 | 52 | 56 | 140.40 |
| | | | | |
| Ex. 3 | | Performance Quotient | | |
| | Bid | Quality | Delivery | Buy Recomendation |
| XYZ | 100 | 52 | 56 | 108.00 |
| PDQ | 111 | 48 | 50 | 108.78 |
| ABC | 115 | 50 | 50 | 115.00 |
| ACME | 110 | 60 | 60 | 115.00 |
| IRS | 116 | 65 | 50 | 120.00 |

FIG-27

SYSTEM AND METHOD FOR PROCUREMENT OF PRODUCTS

FIELD OF THE INVENTION

The present invention relates to web-based procurement systems and methods. In particular, the present invention relates to web-based systems and methods for procurement of products that may be used in a manufacturing facility.

BACKGROUND OF THE INVENTION

Engineered-to-order products are products that are manufactured or built by a supplier according to a customer's requirements or specifications. Procurement of engineered-to-order parts or components by manufacturers is a time-consuming and labor-intensive process. The supplier and customer may need to communicate frequently to be certain the customer's requirements are met. As a result, the procurement or ordering cycle may last as long as 16 days.

Typically, the procurement or ordering cycle begins when a user or requestor for the customer completes a purchase order requisition and prepares for submission to a supplier drawings that set forth the requirements and specifications for the engineered product. This process may take one to three days. Another one to two days may be spent in a review or approval process to confirm that the user or requestor's request is complete and accurate. Next, the buyer for the customer may spend one to three days preparing and sending requests for quotations (RFQ) to suppliers who may be able to fulfill the request. In many instances the drawings for the engineered-to-order product are delivered by U.S. mail or another delivery service. Delays in the delivery of drawings further increase the cycle time. The suppliers may require two to four days to review the RFQ and submit quotations responsive to the request. The buyer may then require one to three days to review the submitted quotations to select a supplier and complete the purchase order with the selected supplier information. Finally, another day may be needed to submit the purchase order to the supplier and send a confirmation to the supplier.

The long procurement or ordering cycle increases the costs of obtaining engineered-to-order products. Therefore, there is a need for a system and method that reduces the procurement or ordering cycle time for engineered-to-order products, and that facilities a buyer's workflow in managing the purchase of engineered-to-order products.

SUMMARY OF THE INVENTION

The present invention is a web-based system and method for procurement of products that facilitates the workflow management for buyers. In an example embodiment of the present invention, the procurement of engineered-to-order products is supported. The present invention reduces the time taken to source and award purchase orders to suppliers. It supports and automates many of the elements of a buyer's daily responsibilities and therefore reduces the likelihood that documents such as drawings and purchase orders are lost or misplaced.

The present invention comprises a buyer's workbench (BWB) that operates in conjunction with a web-based marketplace application for suppliers and an enterprise resource planning system (ERP) that links together a company's operations including purchasing, manufacturing, distribution, human resources, and financials. The BWB facilitates the workflow management for buyers by allowing them to review purchasing requirements according to various criteria and based on varying assumptions to obtain an optimal procurement strategy. Data regarding supplier quality and delivery are tracked through the ERP and used by the buyer to award purchase orders. The supplier quality and delivery data is used as a factor in determining the total cost of buying products from a particular supplier. The use of the supplier quality and delivery data allows the buyer to make more objective selections when awarding purchase orders and increases the likelihood that orders will be placed with the suppliers who are most able to meet the customer's needs. The flexibility provided by the BWB allows the buyer to manage his or her purchase order workload and then distribute it to suppliers that most appropriately meet the needs of the company or have the greatest probability of meeting the needs of the company.

As the buyer works in the BWB, actions and decisions are recorded and maintained in the ERP. The recording and maintenance of this data provides an audit trail and tie back to backend systems for material receipt, purchasing records, and accounts payable information. The BWB provides for automatic creation of part-masters and bills-of-material and reduces human effort required with redundant data entry. As suppliers are selected for purchase order awards in the BWB, purchase order records and project management records are created in the ERP. The BWB extracts the purchase order data from the ERP to generate an electronic version of a purchase order that is distributed to the winning supplier. Concurrently, losing suppliers are notified that they were not selected.

The web-based marketplace application for suppliers comprises an interface that allows suppliers to review and collect information about opportunities to fulfill orders, such as for engineered-to-order products. They may review information regarding current and past purchase order activity with the company, current quality and delivery information on their own companies and their peers, and documents (required and optional) for conducting business with the company. They may also review general and specific information regarding their transactions with the company. The marketplace application also provides access to drawings that present the company's requirements and specifications for the engineered-to-order products. Buyers, through the BWB, may manage the information that is available to suppliers through the marketplace application and marketplace application interface.

The present invention assists buyers by facilitating their workflow management. It also assists suppliers by providing them with access to order fulfillment opportunities and information regarding their performance in fulfilling orders on behalf of the company. Suppliers may use the performance information available from the marketplace application to improve their own operations.

BRIEF DESCRIPTION OF THE DRAWINGS

FIGS. 1 to 22 describe a Buyer's Workbench for an example embodiment of the present invention.

FIG. 1 is a system architecture diagram of the primary components for an example embodiment of the present invention;

FIG. 2 is a flow diagram of the primary steps for operating a web-based marketplace for procurement of engineered-to-order products;

FIG. 3 is a workflow tab of a purchase order release screen for an example embodiment of the present invention;

FIGS. 4 and 5 are single-item detail tabs of a purchase order release screen for an example embodiment of the present invention;

FIG. 6 is a generate request for quote (RFQ) tab of a purchase order release screen for an example embodiment of the present invention;

FIG. 7 is a line items tab of a purchase order release screen for an example embodiment of the present invention;

FIG. 8 is a locate supplier screen for an example embodiment of the present invention;

FIG. 9 is a part history tab of a purchase order release screen for an example embodiment of the present invention;

FIGS. 10 and 11 are locate a purchase order and locate a RFQ screens for an example embodiment of the present invention;

FIG. 12 is a supplier tab of a supplier maintenance screen for an example embodiment of the present invention;

FIG. 13 is a profile tab of a supplier maintenance screen for an example embodiment of the present invention;

FIG. 14 is a notes/docs tab of a supplier maintenance screen for an example embodiment of the present invention;

FIG. 15 is an accounts payable tab of a supplier maintenance screen for an example embodiment of the present invention;

FIG. 16 is a composite quality and delivery (QCD) tab of a supplier maintenance screen for an example embodiment of the present invention;

FIG. 17 is a bid history tab of a supplier maintenance screen for an example embodiment of the present invention;

FIG. 18 is a search tab of a supplier requests screen for an example embodiment of the present invention;

FIG. 19 is a supplier requests for information tab of a supplier request screen for an example embodiment of the present invention;

FIG. 20 is a profile change tab of a supplier requests screen for an example embodiment of the present invention;

FIG. 21 is a block diagram of the primary supplier marketplace functions for an example embodiment of the present invention; and FIG. 22 is an open RFQs screen for an example embodiment of the present invention.

FIGS. 23 to 27 describe a marketplace application for an example embodiment of the present invention.

FIG. 23 is an open RFQ detail screen for an example embodiment of the present invention;

FIG. 24 is an "ask a question" screen for an example embodiment of the present invention;

FIG. 25 is a supplier performance screen for an example embodiment of the present invention;

FIG. 26 is a purchase orders search screen for an example embodiment of the present invention; and FIG. 27 is example performance quotient data (quality and delivery) for a plurality of suppliers.

DESCRIPTION OF EXAMPLE EMBODIMENTS

Figure 1:
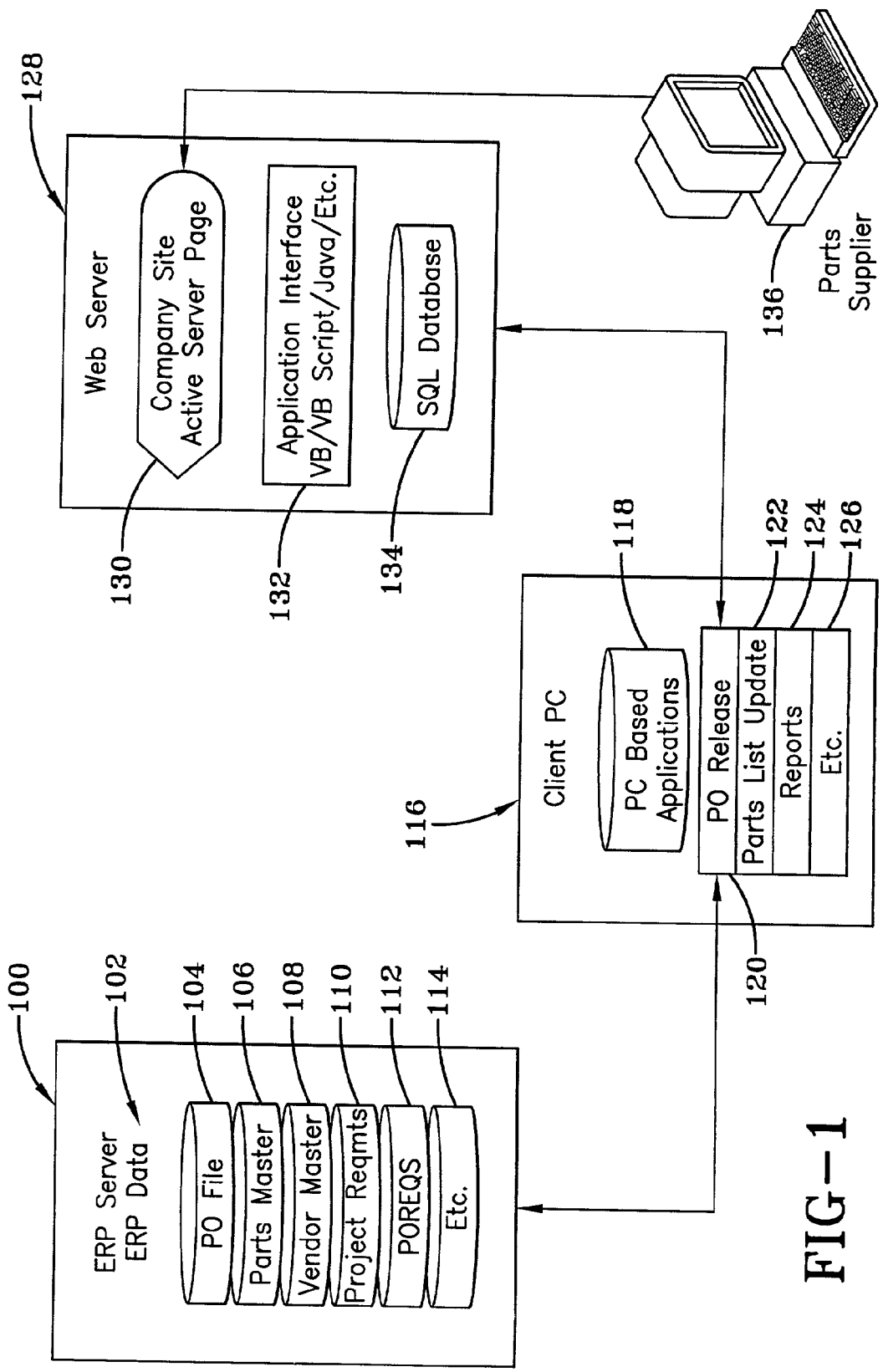

The present invention is described in relation to a system and method for procurement of engineered-to-order products. Referring to FIG. 1, a system architecture diagram of the primary components for an example embodiment of the present invention is shown. The present invention comprises an ERP server 100 that links a company's operations (e.g., purchasing, manufacturing, distribution, human resources, and financials) and comprises ERP data 102 related to purchasing. ERP purchasing data 102 may be stored in one or more databases accessible via the ERP server 100. For example, the ERP server 100 may be used to access data in a purchase order database 104, parts master database 106, vendor master database 108, project requirements database 110, and purchase order requisitions database 112. Information from the ERP server 100 may be accessed through a client personal computer (PC) 116. PC based applications 118 on the client PC 116 may allow a user to perform functions such as a purchase order release 120, parts list update 122, and reports generation and review 124. The PC based applications 118 may comprise a buyer's workbench (BWB) that operates in conjunction with a web-based marketplace application 132 that executes on a web server 128. Information regarding the company's need for engineered-to-order products may be uploaded to a SQL database 134 at the web server 128.

The marketplace application at the web server 128 may comprise active server pages 130 that allow a parts supplier computer 136 to respond to opportunities to fulfill orders for engineered-to-order products. The active server pages 130 allow the supplier to access information regarding the needed engineered-to-order products that has been stored at the SQL database 134. The active server pages 130 and application interface 132 also support the parts supplier's 136 access to performance data and in some cases, the performance data of other suppliers.

Figure 2A:
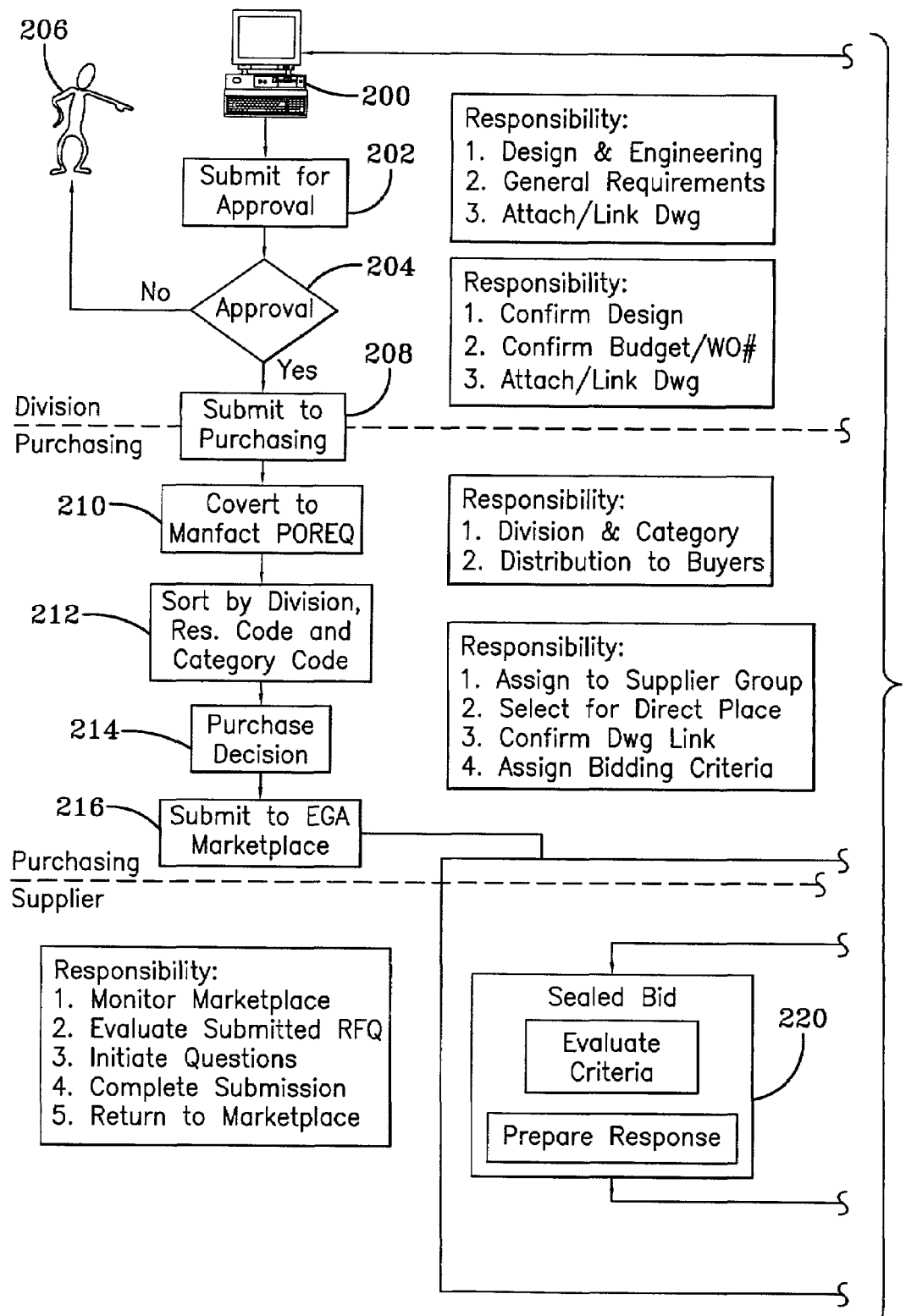
Figure 2B:
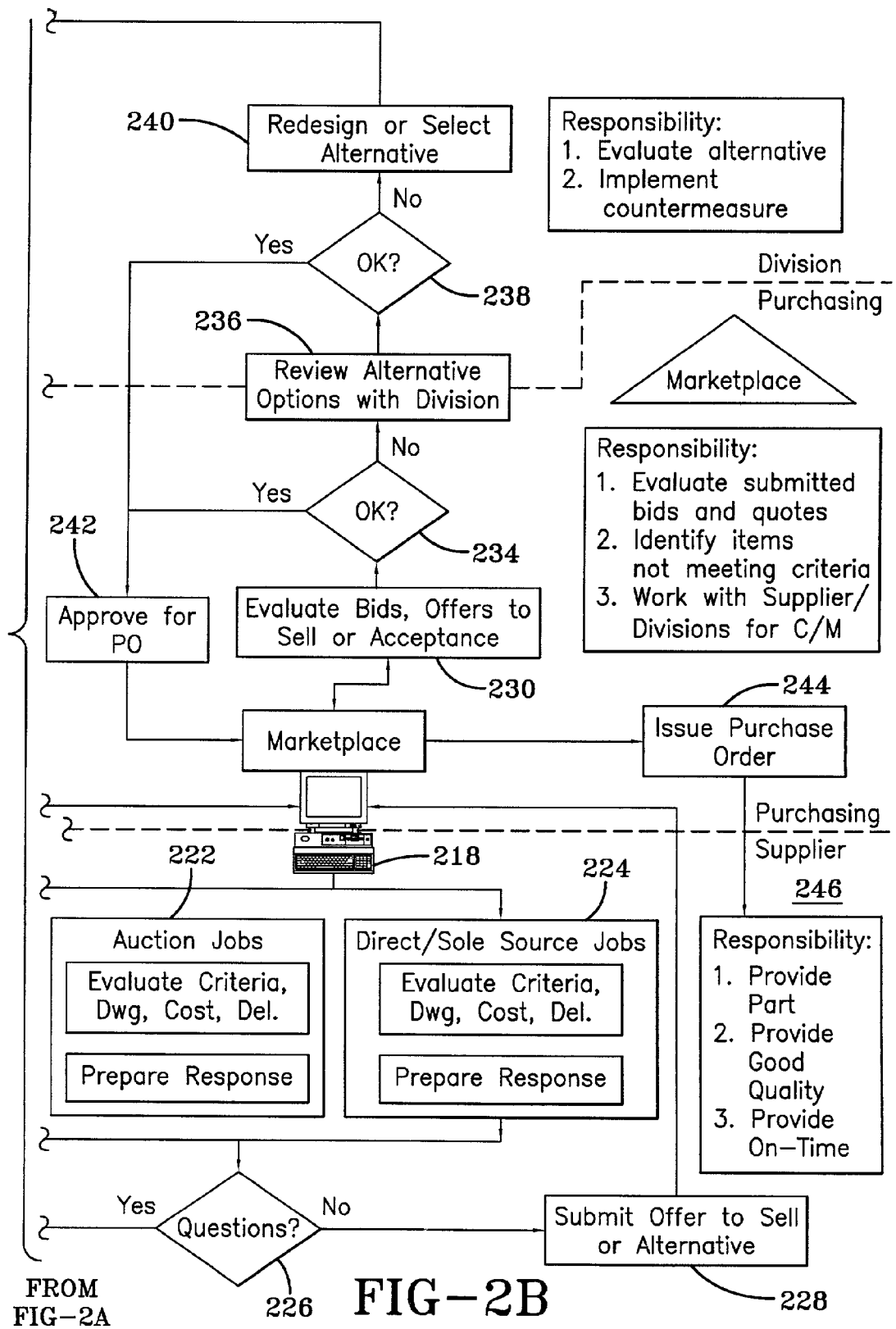

Referring to FIG. 2, a flow diagram of the primary steps for operating a web-based marketplace for procurement of engineered-to-order products is shown. In the first step 200, information regarding an engineered-to-order product is developed by a member (step 206) of a design and engineering department. Examples of engineered-to-order products that may be required by a manufacturer may include a special die for a machine in the manufacturer's facility or a custom part for a product manufactured in the manufacturer's facility. The engineered-to-order product information comprises the general requirements for the product and a drawing of the product. The drawing may comprise detailed information related to the company's requirements and specifications for the product. Next, the design is submitted for approval (step 202). Approval may be provided by a representative of manufacturing with knowledge regarding the needed product. The manufacturing representative may be asked to confirm the design and budget for the project. If the design is not approved (step 204), it may be referred back to the member of the design and engineering department who developed the proposed design. If the design is approved, it may be submitted to purchasing (step 208). Once the design is received in purchasing, it may be converted to a manufacturing purchase order requisition 210. Multiple purchase order requests may be received in purchasing and sorted according to various criteria such as by division, resource, or category codes (step 212). Once the purchase orders are sorted, they may be distributed and assigned to different buyers within the purchasing department. Each buyer may than manage the purchase order requisitions as may be needed to meet the needs of manufacturing (step 214). In managing the purchase order requisitions, the buyer may assign each purchase order requisition to a supplier group so that a request for quotation (RFQ) based on the requisition may be submitted to the marketplace application for bidding. In some instances, a buyer may decide not to submit a RFQ to the marketplace and may submit it directly to a particular supplier as a direct/sole source job. For some engineered-to-order products, only one supplier may be capable of supplying the product. For example, the supplier may have installed special tooling in its facility in order to meet the specifications and requirements of the company. As a result, the buyer may direct the purchase order requisition to the one supplier known to have the appropriate equipment and the capability to fulfill the order.

In most instances, more than one supplier may be capable of supplying the needed engineered-to-order product. The buyer may confirm the accuracy of the drawing and assign bidding criteria to a RFQ to be submitted to the marketplace. Next (step 216), the RFQ may be submitted to the marketplace.

At the marketplace, in step 218, RFQs are submitted to different areas within the marketplace based on type. Suppliers may access the different marketplace areas (sealed bids, auction bids, direct/sole source jobs) to decide whether they want to submit a bid in response to the RFQ. Sealed bids are open to invited suppliers believed to have the capabilities to respond to a particular RFQ. Supplier responses for a sealed bid are not shared between the invited suppliers so each supplier does not know whether it has submitted the lowest bid. Auction bids are open to suppliers who have met certain selection criteria. In an auction bid, the suppliers have access to information, including pricing or quote price information, regarding the bids of other suppliers. As a result, a supplier may decide to submit a bid with a lower cost than the currently submitted bids in an effort to increase its chances of submitting the winning bid. For sealed bids (step 220), suppliers may evaluate the job criteria and prepare a response. For auction bids (step 222) and direct/sole source jobs (step 224), suppliers may evaluate the job criteria and other details related to the job and prepare a response.

For each type of bid, suppliers may be given the opportunity to initiate questions to the company buyer who has posted the RFQ at the marketplace (step 226). Suppliers who are reviewing the RFQs may want to ask the company buyer various questions about the request. The buyer's answers to the questions may impact other suppliers' bids. For example, suppliers may ask about acceptable component substitutions or changes to the delivery date or terms. If the questions that are asked and answered have an impact on the bids that the suppliers are likely to submit (step 226), then the question and answer may be made public and posted at the marketplace for all suppliers to see (step 218). In addition, the RFQ criteria may be updated (step 218). If the supplier has no questions regarding the request for quotation, the supplier may submit an offer to sell (or bid/quote) that matches the criteria of the RFQ (step 228). In some instances, the supplier may submit an alternative bid specifying criteria differing from the RFQ, but that the supplier believes will meet the company's needs. In the case of sealed and auction bids, while the bidding is open, suppliers may be permitted to return to the marketplace multiple times in order to submit more than one bid or to update a bid that has been submitted previously.

After the bidding period closes, the buyer may evaluate the bids and offers to sell for the sealed and auction bids (step 230). The buyer may also evaluate acceptances of direct/sole source jobs (step 230). If a supplier submits a bid or quote with items that do not meet the RFQ criteria (step 234), the buyer may communicate with other employees in the manufacturing division that requested the engineered-to-order product to confirm that the needs of the company will be met with the supplier's non-conforming bid or quote (step 236). If the non-conforming bid or quote is acceptable (step 238), the buyer may then submit through the marketplace approval for a purchase order to be sent to the winning supplier (step 242). A purchase order is then issued to the winning supplier (step 244) and the supplier responds by delivering the product according to its bid or quote (step 246). If the non-conforming bid or quote is not acceptable (step 238), the manufacturing division that requested engineered-to-order product may redesign the product or select an alternative product to submit to purchasing (step 240). Starting again at step 200, information regarding the engineered-to-order product is developed by a member (step 206) of a design and engineering department.

If the buyer determines that a particular supplier's bid or quote meets the company's needs (step 234), the buyer may then submit through the marketplace approval for a purchase order to be sent to the winning supplier (step 242). A purchase order is then issued to the winning supplier (step 244), and the supplier responds by delivering the product according to the company's specifications and requirements as well as delivery terms (step 246).

Figure 3:
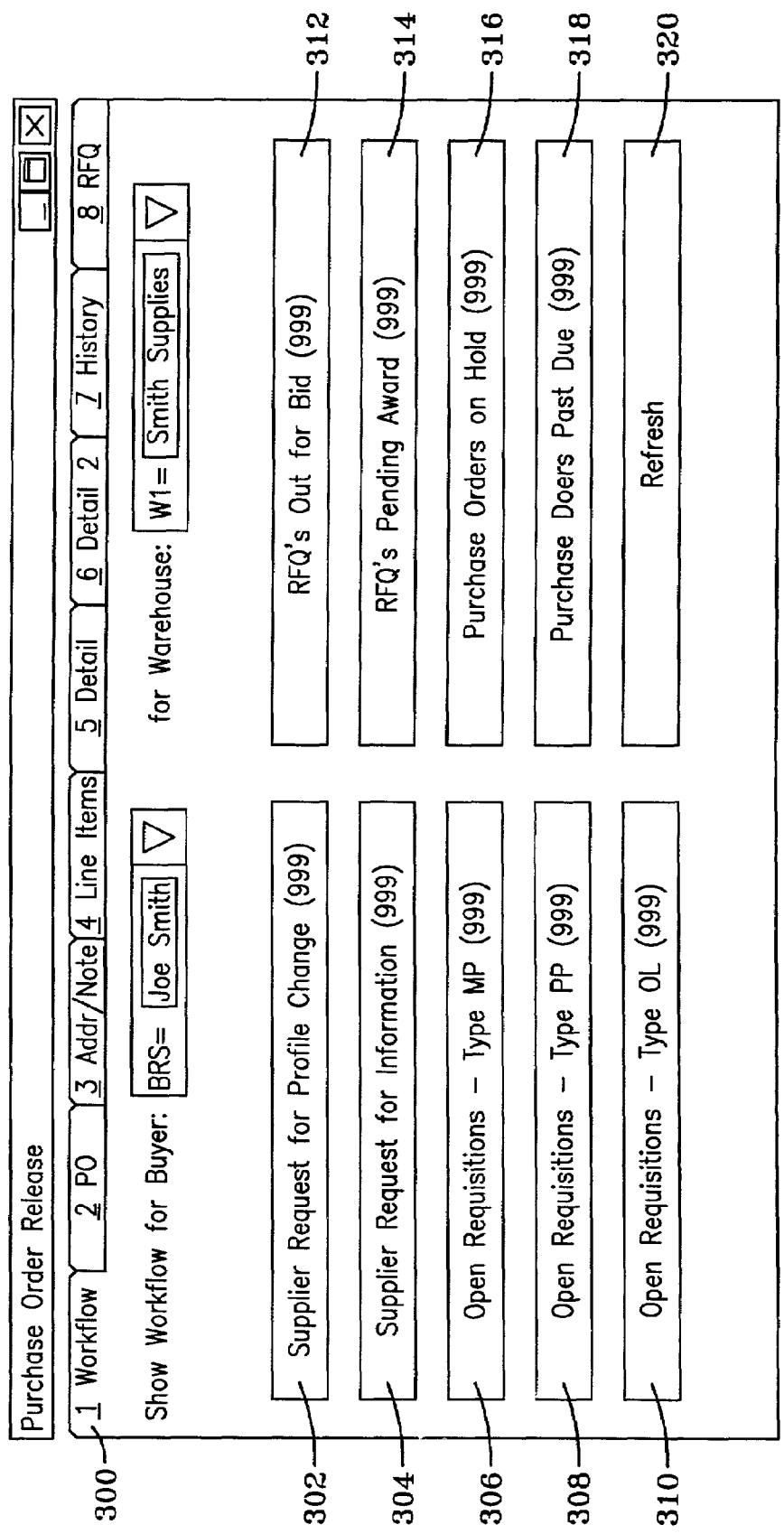

The BWB provides the buyers in a purchasing department with the features and functionality to manage workflow and the marketplace according to an example embodiment of the present invention. Referring to FIG. 3, a workflow tab of a purchase order release screen for an example embodiment of the present invention is shown. The workflow tasks shown on the workflow tab 300 that may be performed by the buyer using the workbench application are shown (Supplier Request for Profile Change 302, Supplier Request for Information 304, Open Requisitions-Type MP (Manufactured Parts) 306, Open Requisitions-Type PP (Purchased Parts) 308, Open Requisitions-Type OL (Outside Labor) 310, RFQs Out for Bid 312, RFQs Pending Award 314, Purchase Orders on Hold 316, Purchase Orders Past Due 318, Refresh 320). The screen of FIG. 3 is displayed upon startup of the workbench application and may be revisited on-demand throughout the buyer's online session. The screen provides the buyer with immediate visibility to tasks requiring his or her attention. On each button following a task (Supplier Request for Profile Change 302, Supplier Request for Information 304, Open Requisitions-Type MP (Manufactured Parts) 306, Open Requisitions-Type PP (Purchased Parts) 308, Open Requisitions-Type OL (Outside Labor) 310, RFQs Out for Bid 312, RFQs Pending Award 314, Purchase Orders on Hold 316, Purchase Orders Past Due 318), the number of items pending (open count item) for a particular task is displayed. The buyer may click on a button to directly access the applicable screen for each task that needs to be performed.

The open item count displayed for each task is refreshed automatically according to a user defined time interval (e.g., refresh every 15 minutes). The buyer may also request an immediate update by clicking the Refresh button 320. During the update, the workbench application checks the status of all open RFQ's posted to the marketplace and updates the status where appropriate. For auction bids, the status is changed to "Pending Award" when the scheduled close date/time has passed. For sealed bids, the status is changed to "Pending Award" when all invited suppliers have submitted bids, or when the close date/time has passed, whichever is earlier. The buyer reviews the "Pending Award" RFQs and awards purchase orders to suppliers based on various selection criteria. In an example embodiment of the present invention, purchase orders may be awarded to suppliers based on a weighted cost that company assigns to each supplier bid or quote. The weighted cost is based on the supplier's quote price and the performance data that the company has for the supplier.

Referring to FIGS. 4 and 5, single-item detail tabs of a purchase order release screen for an example embodiment of the present invention are shown. Requisition and purchase order line item detail is displayed in forms as shown in FIGS. 4 (detail tab 330) and 5 (detail 2 tab 340). The details relate to the information a buyer may need to track a purchase order that has been submitted to and accepted by a supplier. Referring to FIG. 4, data and information regarding the following items may be tracked: requisition received by the buyer (number, date, requester); RFQ type; product and supplier information; required and scheduled dates; quantity requested and scheduled; and pricing. Referring to FIG. 5, data and information regarding the following items may be tracked: materials furnished to the supplier; shipping information; and notes.

Figure 6:
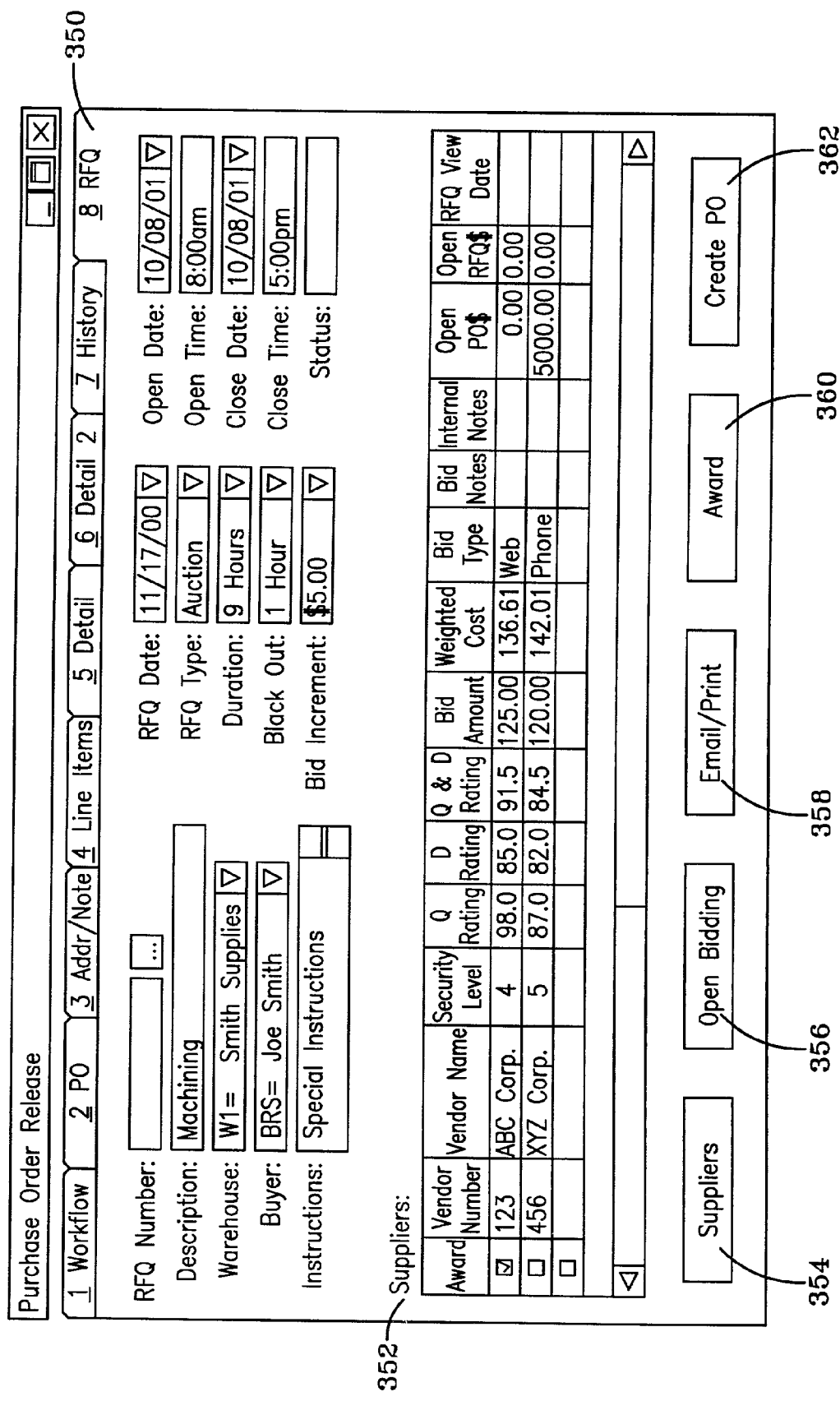

Referring to FIG. 6, a generate request for quote (RFQ) tab of a purchase order release screen for an example embodiment of the present invention is shown. The RFQ 350 may comprise a header record with information such as a RFQ number, description, warehouse (delivery location), buyer responsible for the RFQ, instructions, bidding parameters, and a list of suppliers 352 invited to quote. The bidding parameters include a RFQ date, RFQ type (sealed bid, auction bid, and direct/sole source), and duration. For sealed and auction bids, an open date and time and a close date and time may be specified. A duration may be specified as well. Another parameter that may be specified is a black out period. For auction bids, the black out period occurs for the period specified just before close of the auction. During the black out period, suppliers may not see the bids submitted by the other suppliers participating in the bidding. During this black out period, suppliers make bids without knowledge regarding the pricing submitted by the other suppliers. As a results, some suppliers may submit bids with very favorable pricing in an attempt to become the winning supplier.

The suppliers list 352 allows the buyer to view details regarding the bids submitted by various suppliers for the RFQ. A vendor name, number, security level (that indicates whether the supplier is permitted to submits bids when certain conditions are met), quality rating (an indicator of the quality of products supplied by the vendor), delivery rating (an indicator of the vendor's ability to deliver products on time), a composite quality and delivery rating (a rating combining the vendor's quality and delivery ratings—QCD), bid amount (vendor's bid or quote price), weighted cost (price determined by company based on vendor's bid or quote price and quality and delivery rating), bid type (how the vendor submitted its bid), notes, total open purchase orders for the vendor, total open RFQ dollars for the vendor, and RFQ view data for the vendor. At any time, the buyer may view a list of open RFQs and associated supplier bids. Regardless of whether bids are accepted via the marketplace or another method, suppliers are ranked based on a combination of best bid and weighted cost criteria. The buyer may select the "award" button 360 to award the purchase order to a supplier that has met the buyer's and company's selection criteria. Once the buyer selects a supplier and awards a purchase order, all RFQ records from the suppliers are updated with a win/loss flag. The purchase order requisition record is updated with the selected supplier, quote price, and delivery date. The status of the purchase order requisition is updated to indicate it has been "Awarded." Suppliers that did not win the purchase order may be notified of their loss.

In an example embodiment of the present invention, a purchase order is generated as a Microsoft® Word document. It may then be printed, e-mailed, or faxed to the supplier. Once produced, the Word document may be converted to an Adobe Acrobat file. These files may be placed in a central folder data warehouse accessible to the marketplace for downloading. Terms and conditions for the purchase order may be printed in a message on the purchase order. The buyer may assign the appropriate purchasing text identifier to the supplier so that the purchase order is completed appropriately.

In some instances, it may be necessary to place a completed purchase order on hold. For example, manufacturing production schedules may change after the purchase order has been completed necessitating a hold on the delivery of the products. An item may be placed on hold and highlighted using a distinct row color to indicate the item is on hold.

A non-conformance corrective action notice may be used to record information about products or parts received from a supplier that do not meet the company's quality requirements. The information collected may or may not affect the supplier's quality performance rating, at the buyer's discretion. The non-conformance corrective action notice may be associated with a receipt line item in a purchase order record. Although multiple non-conformance corrective action notice reports may be entered for the same line item, the total quantity rejected may not exceed the receipt quantity. If the non-conformance corrective action is to affect the supplier's quality performance rating, a record is posted to the supplier's performance history data.

The BWB supports the automated creation of delivery confirmation letters and allows them to be e-mailed directly to the supplier. A Microsoft® Word template may be used to produce these letters. All open purchase orders assigned to the buyer with a scheduled delivery date prior to a specified cut-off date may be selected for processing. The buyer may then select which suppliers to include/exclude for receipt of delivery confirmation request letters based on the selected population of purchase orders. Information that the buyer may review includes required response date, vendor name, vendor contact, warehouse, purchase order number, line item number, WO#, part number, vendor description, quantity, date requested, schedule date, number of changes, attention to, and buyer.

For bids not handled by the marketplace, the buyer may manually input bids received from suppliers. System records are updated appropriately. A win/loss notification letter is generated for each supplier who bid on the RFQ. Based on a supplier profile, these notifications may be printed and mailed, or e-mailed directly to the supplier.

By selecting the "suppliers" button 354, the buyer may choose one or more suppliers from a list of those qualified for the part category. Once a RFQ has been created, it may be printed and/or e-mailed using the "email/print" button 358, and it may posted to the marketplace for bidding by using the "open bidding" button 356. The ERP system maintains a history of all RFQ activity submitted via the marketplace. One or more purchase order requisitions may be selected and included on a RFQ. The status of the purchase order requisition record is updated to indicate it is "open for bidding." The buyer may select the "create PO" button 362 to create a purchase order for the supplier that has been awarded the purchase order based on its response (bid or quote) to the RFQ.

Figure 7:
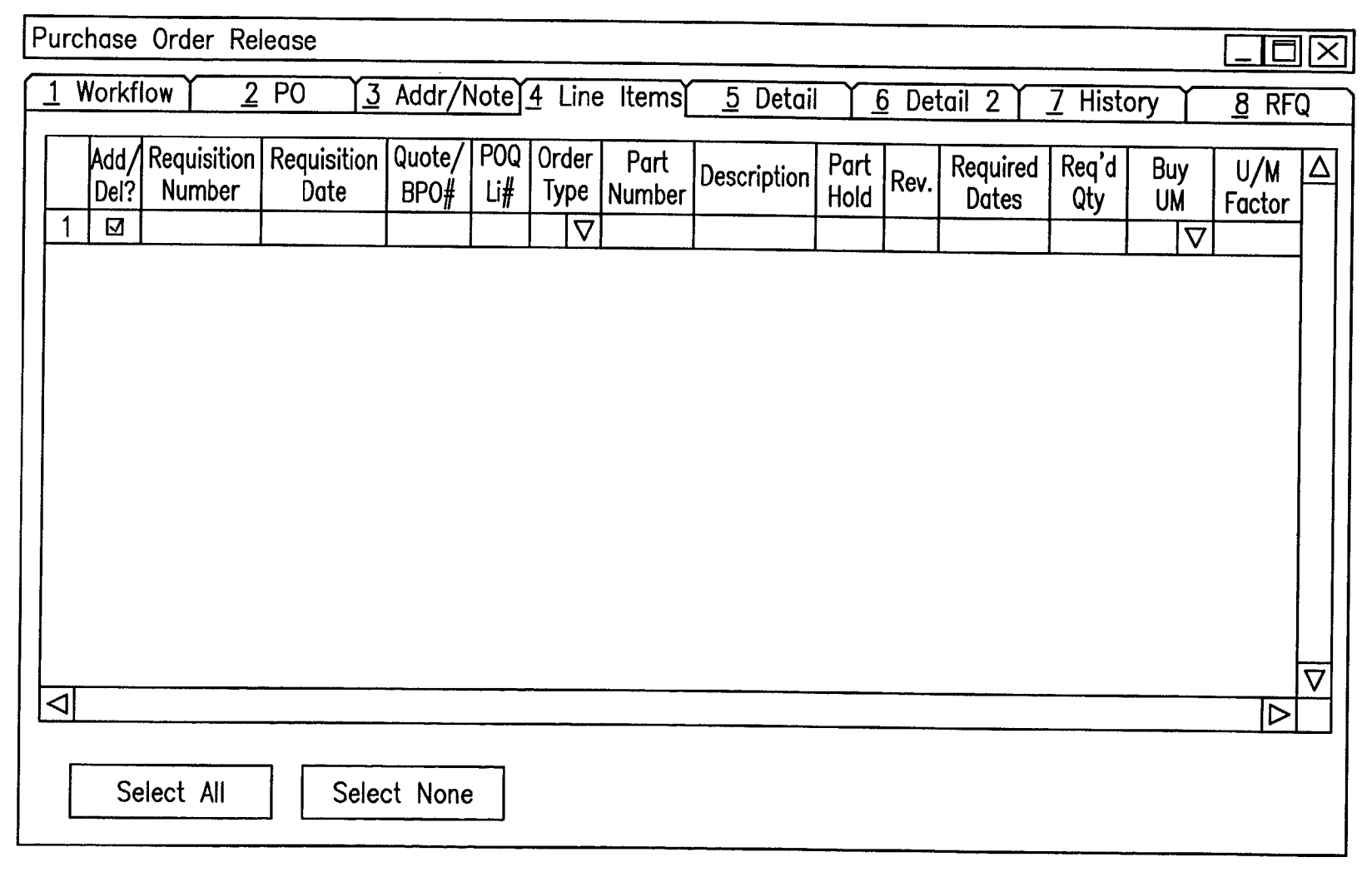

The present invention supports bid packaging. In some cases, it is desirable to have a group of parts manufactured by the same supplier. When multiple items are included on a RFQ, the supplier may be required to bid on each and every item. When awarding a purchase order, partial or incomplete bids may be rejected. The items that belong to a RFQ may be shown in a "line items" tab. Referring to FIG. 7, a line items tab of a purchase order release screen for an example embodiment of the present invention is shown. A RFQ may comprise several parts. The line items tab shows detailed information regarding parts that are associated with a RFQ. The line items of the RFQ may include part number, description, category, and quantity. A drawing may be linked to each line item by specifying a file name. An "auto locate" feature searches for drawing files using standard naming conventions. The buyer may browse for any missing drawings.

Referring to FIG. 8, a locate supplier screen for an example embodiment of the present invention is shown. A buyer may enter search criteria 364 to locate suppliers. The buyer may select a list of suppliers based on various categories such as responsible buyer or part categories, etc. Information displayed includes current vendor identity code and contact information, composite quality and delivery ratings (QCD), and security level. This information is also visible during buyer bid selection.

The buyer may elect to post any RFQ to the marketplace. Drawing files are converted to a format suitable for display on a web page (e.g., .jpeg), and copied to a central location data warehouse accessible to suppliers through the marketplace web site. Suppliers may specify in a supplier profile a preferred method for receiving notifications from the company (e.g., email, postal mail, fax, web). Notifications are generated for each supplier and sent according to the method specified in the supplier's profile.

Referring to FIG. 9, a part history tab of a purchase order release screen for an example embodiment of the present invention is shown. In the selection criteria area 370 of the tab, the buyer may enter selection criteria related to a part number and a time period. A description for the part is shown also. The part history tab allows both receipts and quotes to be viewed for a part number. Items that meet the selection criteria 370 are presented in a list 372.

Referring to FIGS. 10 and 11, locate a purchase order and locate a RFQ screen for an example embodiment of the present invention is shown. The buyer may locate an existing purchase order or RFQ using a variety of search criteria 380, 390. The buyer may select a purchase order or RFQ that meets the selection criteria 380, 390 to view details about the purchase order or RFQ.

Figure 13:
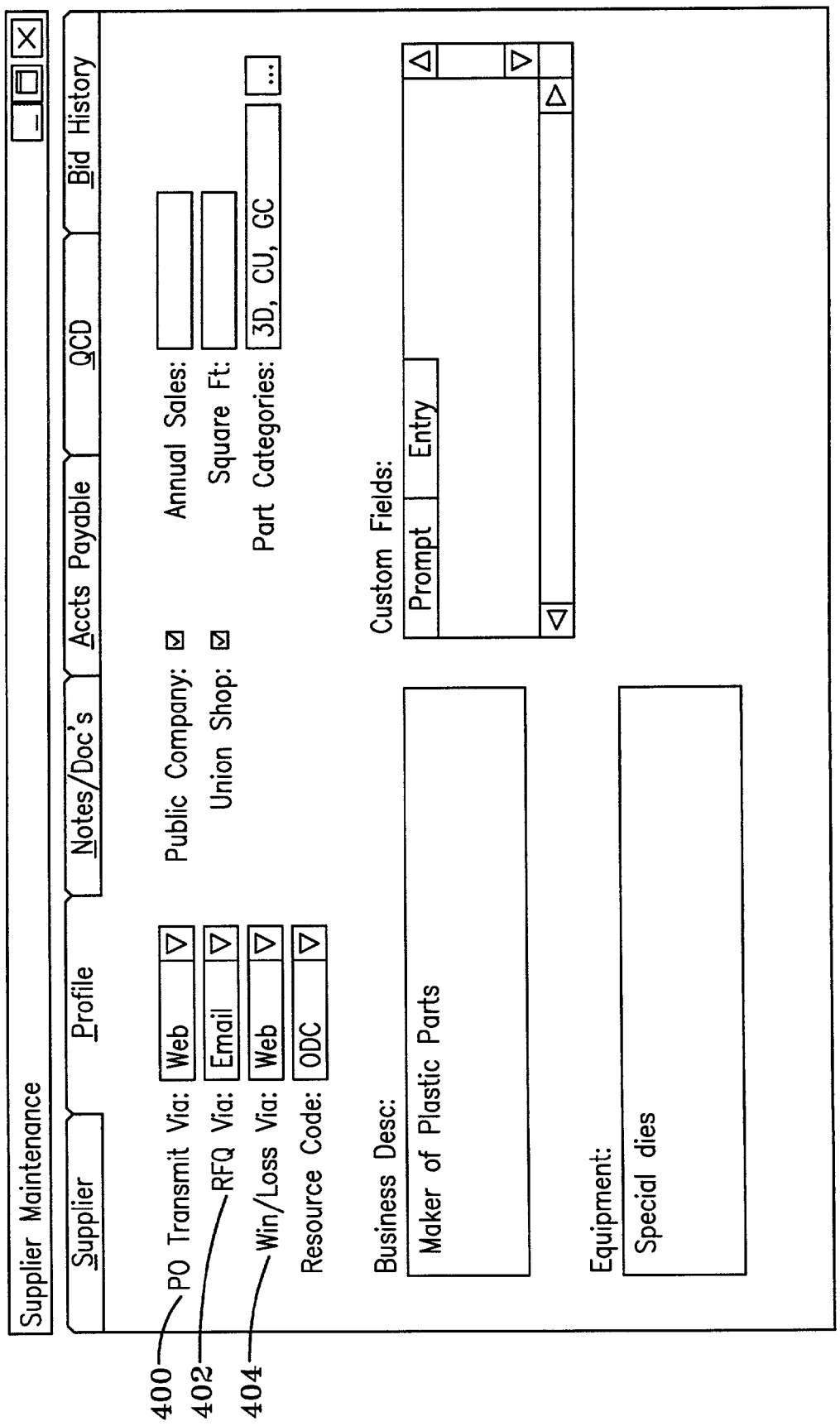

Referring to FIG. 12, a supplier tab of a supplier maintenance screen for an example embodiment of the present invention is shown. Contact information and information regarding the supplier's delivery methods and procedures may be entered for each supplier. Referring to FIG. 13, a profile tab of a supplier maintenance screen for an example embodiment of the present invention is shown. The profile tab contains additional prompts including the supplier's preferred methods for transmitting documents and receiving notifications regarding purchase orders 400, RFQs 402, and wins/losses 404. Options for receiving notifications may include the marketplace web site, email, telephone, or regular mail.

Buyers may communicate with suppliers using supplier notifications. The buyer may generate a message to be displayed on the marketplace web site and/or e-mailed to one or more suppliers based on the supplier's preference identified in the profile tab. The list of suppliers who will receive the buyer's message may be selected based on various criteria including RFQ number, part type, authorized part categories, etc. Messages posted to the web site from the buyer's workbench have an expiration date and are directed to a specific list of suppliers. Additionally, messages applicable to all suppliers and messages without expiration dates may be posted using a system administrator utility.

Referring to FIG. 14, a notes/docs tab of a supplier maintenance screen for an example embodiment of the present invention is shown. The notes/doc's tab supports entry of both internal and external notes fields, and maintains a list of signed documents for the supplier. Internal notes are displayed on the supplier selection screens. Optionally, an expiration date may be entered after which time the note will no longer be displayed. A master list of legal documents 410 may be maintained using a marketplace administration utility. The buyer may decide which documents are required for each supplier and enter information in the Date Signed and Verified By fields.

Figure 16:
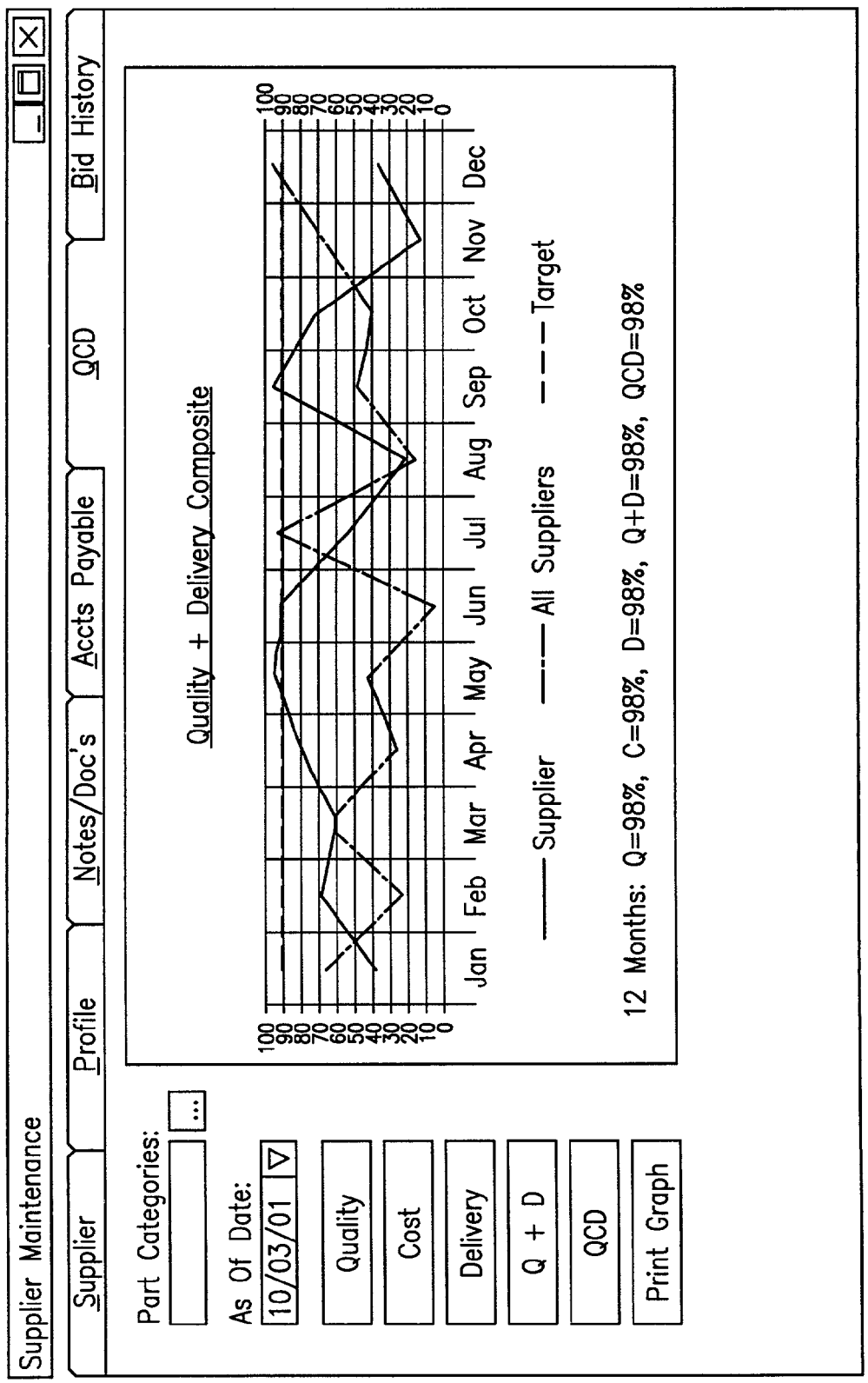

Referring to FIG. 15, an accounts payable tab of a supplier maintenance screen for an example embodiment of the present invention is shown. The accounts payable tab may be accessed by users with security clearance to access the ERP system. Referring to FIG. 16, a composite quality and delivery (QCD) tab of a supplier maintenance screen for an example embodiment of the present invention is shown. The QCD tab provides a graphical view of the supplier's quality, cost, and delivery performance data based on delivers the supplier has made to the company. The QCD data may be used by the buyer when awarding a purchase order to a supplier who has submitted a bid or quote in response to a RFQ. Referring to FIG. 17, a bid history tab of a supplier maintenance screen for an example embodiment of the present invention is shown. The buyer may enter various search criteria 420. For example, the buyer may view bid history for a supplier for selected part categories within a date range.

Referring to FIG. 18, a search tab of a supplier requests screen for an example embodiment of the present invention is shown. In some cases, a supplier may want to change one or more parameters associated with its profile. In other cases, when determining whether to respond to RFQs at the marketplace web site, a supplier may have specific questions about certain aspects of the RFQs. For example, a supplier may want to know whether a certain material or component of the engineered-to-order product may be substituted or whether the delivery date may be changed. The buyer who posts the RFQ may be responsible for reviewing and responding to the supplier questions that relate to the RFQ. The list of supplier requests may be accessed from the workflow tab or from the drop-down menu on the main screen of FIG. 3. The search tab allows the buyer to enter search criteria 430 to locate supplier requests that meet the search criteria.

Referring to FIG. 19, a supplier requests for information tab of a supplier request screen for an example embodiment of the present invention is shown. The buyer may view and post answers to requests for information received from the marketplace. When answering a question, the buyer has several options for distributing the answer 440. The buyer may choose to make the answer public so that all bidding suppliers may view the information. Alternatively, the answer may be posted as private so only the requesting supplier may see it. The buyer's answer may also be e-mailed directly to the supplier that posed the question. Finally, the buyer's answer may be emailed to all suppliers so that all suppliers submitting bids or quotes for the RFQ have the same information regarding the RFQ.

Referring to FIG. 20, a profile change tab of a supplier requests screen for an example embodiment of the present invention is shown. The responsible buyer may see that a request for profile change is pending by using the workflow view features of FIG. 3. Current values and new values are displayed and changed values are highlighted. The buyer may accept or reject the changes to the profile that the supplier has requested.

The BWB allows the buyer to set values for a variety of user options. The buyer may set a variety of personal preferences by choosing a View, Options feature from the menu. The options include color preferences, column order, hidden columns, as well as others. A workflow refresh time interval allows the buyer to specify the frequency in minutes to refresh the open item counts on the buyer's workflow view. Another feature allows the buyer to select a row color for items on "hold." Finally, the buyer may select options to play a sound and/or pop-up a message when any of the following events occur: supplier request for profile change; supplier request for information; bid posted to an RFQ; bidding closes for an RFQ. These features allow the buyer to monitor activity in the marketplace and respond quickly to suppliers so that the suppliers are better able to respond to the company's needs.

Figure 21:
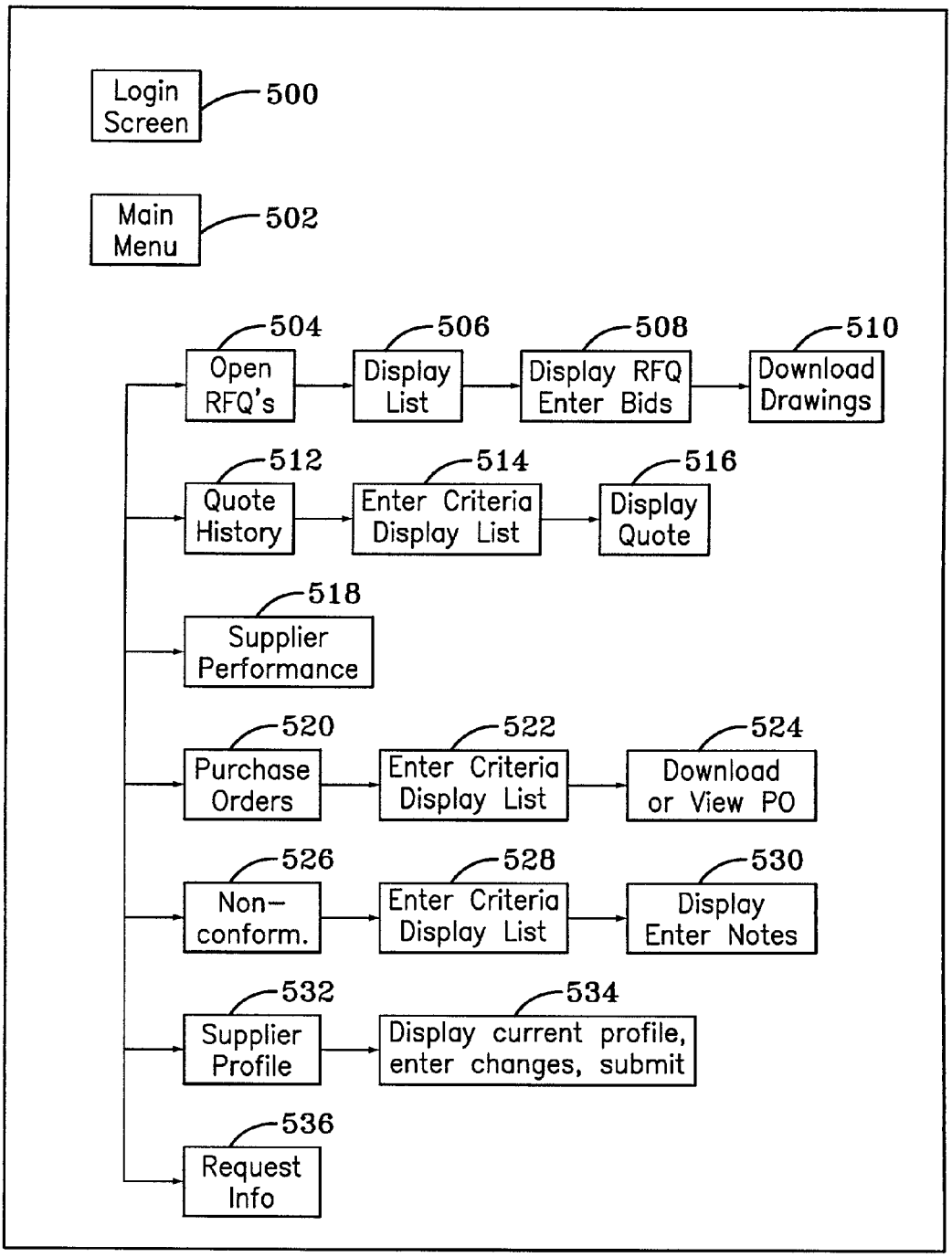

Referring to FIG. 21, a block diagram of the primary supplier marketplace functions for an example embodiment of the present invention is shown. A supplier that accesses the marketplace of the present invention to respond to RFQs may login to the marketplace 500 and access a main menu 502 to perform the following functions: manage open RFQs 504, display a list of RFQs 506, view details for a RFQ and enter a bid 508, view drawings for the engineered-to-order product 510, review a quote history 512, search for quotes 514, view details for quotes 516, review performance data 518, manage purchase orders 520, display a list of purchase orders 522, download or view a purchase order 524, review non-conformance data 526, search for non-conformances 528, view notes 530, manage a profile 532, change a profile 534, and submit requests for information 536. A supplier's access to certain features and functionality may be determined by the supplier's security level.

To access the marketplace, a supplier may be asked to enter a valid user name and password. Once the supplier is granted access to the marketplace, the supplier may select any of the available functions according to applicable security level. In an example embodiment of the present invention, suppliers are assigned security levels that determine their level of participation in the marketplace. Suppliers are able to view information at the marketplace web site according to their security level. For example, security levels may be defined so that all suppliers may view their profile entries. However, only certain suppliers may view the performance history data or non-conformance data collected by the company. Table 1 shows security levels that may be assigned to suppliers for an example embodiment of the present invention.

a blackout start time, time remaining until close, lowest quote, and lowest weighted quote. To submit a bid, the supplier enters a price and a promised delivery date for each part on the RFQ. Submitted bids are posted to an ERP system file. The marketplace displays real-time status of active auctions including current "best bid."

A blackout period may apply to an auction RFQ. While the auction is open, a supplier may bid as often as desired until the beginning of the blackout period (as an example, the last two hours of an auction may be blacked out). During the blackout period, lowest quote and lowest weighted quote information is not shown to the suppliers. During the blackout period, suppliers may submit one final bid. However, they do not have the benefit of knowledge regarding the current lowest quote and lowest weighted quote. The blackout period prevents suppliers from waiting until the end of the auction period to submit a bid with a current quote that is only slightly lower than the lowest bid. Because suppliers do not have knowledge of the current lowest quote and lowest weighted quote during the blackout, some suppliers may submit quotes with very favorable pricing in an attempt to become the winning supplier.

In an example embodiment of the present invention, all RFQ's, whether auction or sealed bid, have a scheduled close date and time after which no further bids will be accepted. For sealed bids, bidding closes automatically once all invited suppliers have responded.

In some instances, contract pricing may apply to a specific part/vendor combination. If a contract price exists for a specific part/vendor combination, the contract price is displayed by the system and may not be changed by the supplier. In these instances, the supplier may enter only the promised delivery date.

Referring to FIG. 23, an open RFQ detail screen for an example embodiment of the present invention is shown. The supplier may view details related to a RFQ may including bid parameters 540 such as the type, open date, scheduled close

TABLE 1

|  | Level 1 Prospect | Level 2 Candidate | Level 3 Qualified | Level 4 Probation | Level 5 Full Use | Level 6 Buyer |
|---|---|---|---|---|---|---|
| Profile Entry | Yes | Yes | Yes | Yes | Yes | Yes |
| Documents | No | Yes | Yes | Yes | Yes | Yes |
| Sample Work | No | No | Yes | Yes | Yes | Yes |
| Open RFQ's | No | No | No | Yes | Yes | Yes |
| Quote History | No | No | No | Yes | Yes | Yes |
| Performance | No | No | No | Yes | Yes | Yes |
| Purchase Orders | No | No | No | Yes | Yes | Yes |
| Non-conformances | No | No | No | Yes | Yes | Yes |

Referring to FIG. 22, an open RFQs screen for an example embodiment of the present invention is shown. The supplier may view open RFQs using this screen and submit bids via the marketplace web site. The summary screen displays a list of open RFQs the supplier has been authorized to view and bid on. Each RFQ has a number, description, type code identifying it as either an "auction" or a "sealed bid," date opened, scheduled close, current quote, and current weighted quote as determined by the company according to the supplier's current quote and the company's performance data for the supplier. If the RFQ is an auction, additional parameters include date, current quote, current weighted quote, responsible buyer and contact information, job number, status, black out status, time remaining until the close of bidding, designer for the engineered-to-order product, delivery location, and a description 542. The RFQ record may include the pathnames to the drawings associated with the product. When the RFQ is submitted to the marketplace, the selected drawings are converted to a file format suitable for display on a web page and stored in a central location data warehouse accessible to the site. The supplier may view and/or download drawings to better understand the needs of the company and to formulate a response. Special instructions 544 may be associated with the RFQ to give the supplier additional information regarding the RFQ.

The supplier may respond to the RFQ by entering promise date information and a quote price. If the RFQ comprises line items for the specific parts of the product, details regarding the parts may be displayed 546 and the supplier may enter the promise date and pricing for each part.

The supplier may click the "Ask a Question" button 548 to send a request for information to the buyer. An example "ask a question" screen is shown in FIG. 24. The "View Questions and Answers" option 550 displays the answers posted to the web site by the buyer. All questions and answers submitted by the current supplier are displayed, along with any questions submitted by other suppliers where the buyer has deemed this information to be public.

The supplier may view a list of closed RFQs for a specified date range. The RFQs for which the supplier was invited to bid are shown. From the summary screen, the supplier may select an item to view the details of the RFQ.

Figure 25:
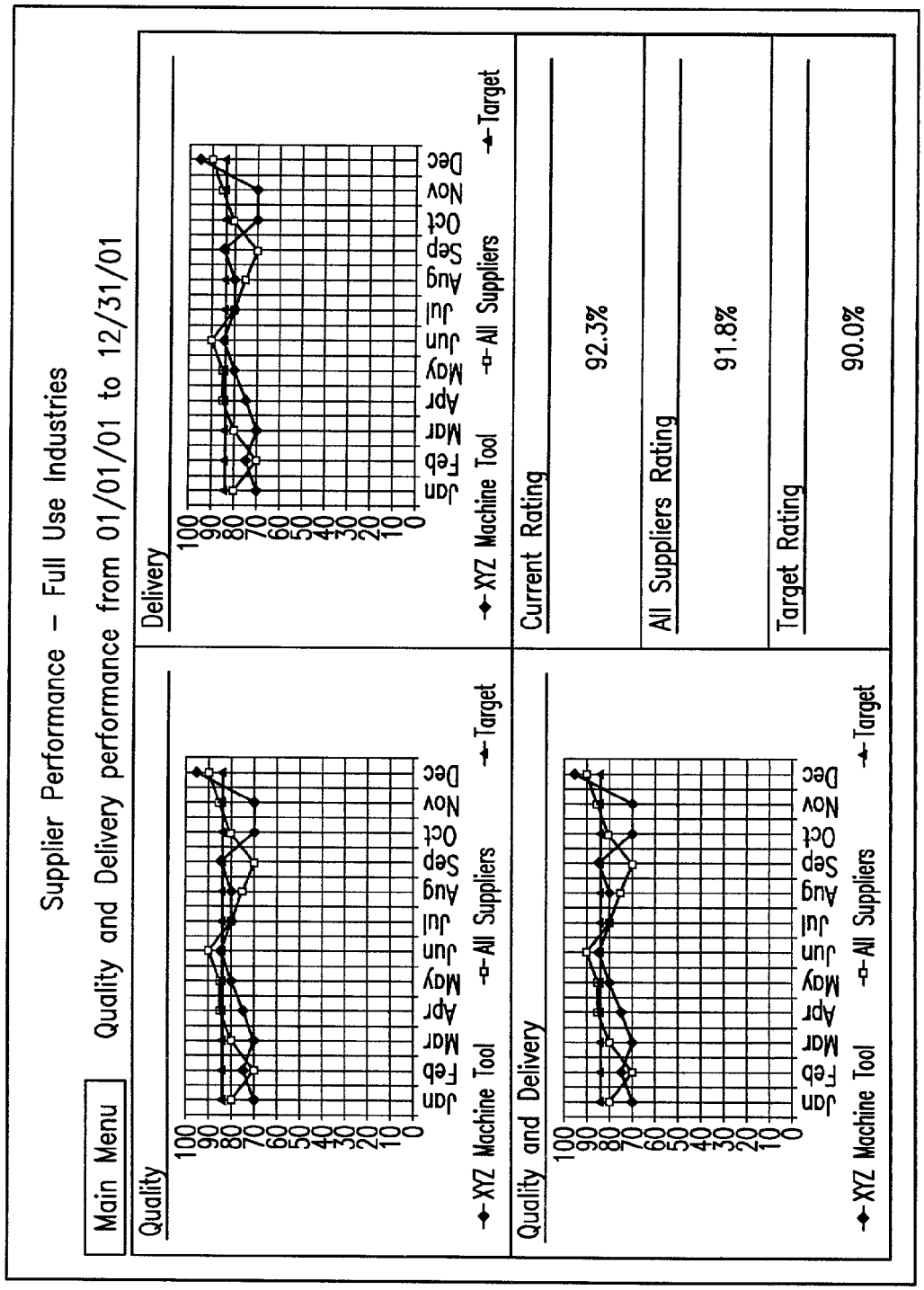

Referring to FIG. 25, a supplier performance screen for an example embodiment of the present invention is shown. This screen allows the supplier to view various charts illustrating its overall quality, delivery, and composite quality and delivery rating (QCD).

Figure 26:

Referring to FIG. 26, a purchase orders search screen for an example embodiment of the present invention is shown. The supplier may search for purchase orders that it has been awarded by entering search criteria 560 such as a purchase order number, status information (all, closed, open, late or on hold) or a date range. The supplier may also specify how the results are sorted (e.g., by purchase order number, by purchase order date, or by due date.) This page displays the number of purchase order line items currently past due and the number of purchase orders currently on hold.

From a summary screen 562, an individual purchase order may be selected to view, print, or download. Purchase orders may be posted to the web site as Adobe Acrobat files. The supplier may also perform other tasks such as submit requests for a profile change.

The marketplace web site accesses the ERP system to read the current supplier profile and display it for the supplier's review. The supplier may make desired changes and submit them. The request for a profile change is stored in the database for later review by the buyer using the buyer's workbench.

As indicated previously, suppliers may be awarded purchase orders based on a weighted cost as determined by the company using supplier performance data. When a supplier delivers products of inferior quality and/or delivers products late, the company must apply resources to correct the problems that result. A supplier's poor quality or tardiness costs the company time and money to correct. Therefore, a supplier's ability to delivery quality products in a timely manner may be factored into an actual cost to the company.

In an example embodiment of the present invention, a composite quality and delivery rating is maintained for each supplier. A vendor performance module rates suppliers based on quality, cost, and delivery (QCD) performance data. Statistics by month for the previous 12 months may be summarized for efficient access from the marketplace web site. The performance data is used to determine a weighting factor that may be applied to a supplier's quote price. The weighted cost represents the true cost of the product to the company based on the supplier's past performance. Supplier performance weighting factors may be defined and stored in the ERP system database. These factors may be entered as a percentage and total 100 as in the following example in Table 2.

TABLE 2

| | |
|---|---|
| Service Performance Weight | 33.33 |
| Quality Performance Weight | 33.34 |
| Price Performance Weight | 33.33 |
| TOTAL | 100.00 |

Quality calculations may be based on quantity of "Good" units delivered by the supplier. "Bad" units are identified based on returns and non-conformance reports. In some cases, the delivered goods may be unusable and therefore, must be returned to the supplier. In other cases, the delivered goods may be usable, but they do not conform to the company's specifications (e.g., wrong color). The quality rating may be equal to the number of good units delivered by the supplier divided by the total units received from the supplier.

Deliveries may be categorized according as early, on time, or late with respect to each receipt of goods. Receipts may be measured on a sliding scale such that a receipt that is two days late results in a lower impact on a supplier's performance rating than a receipt that is 10 days late. The impact of each late receipt may be user-defined as illustrated in the following example in Table 3.

TABLE 3

| | Days Late | Rating |
|---|---|---|
| Delivery #1 | 0 | 100 |
| Delivery #2 | 2 | 90 |
| Delivery #3 | 3 | 60 |
| TOTAL | | 250 |

The delivery rating may be the total number of units delivered divided by the largest "days late" value. (e.g., Delivery Rating=250/3=83%)

The composite quality and delivery rating (QCD) value that is applied to the supplier's bid or quote price is a combination of the quality and delivery ratings.

TABLE 4

| | Rating | Weight | Result |
|---|---|---|---|
| Quality | .96 | .5 | .48 |
| Delivery | .80 | 5 | .40 |
| TOTAL | | | .88 |

Referring to FIG. 27, example QCD data or performance quotient data (quality and delivery) for a plurality of suppliers is shown. Supplier bids may be weighted using the indicated formulas to determine a "total cost" as shown in the "Buy Recommendation" column to the company. Buyers may award purchase orders using the weighted cost data rather than the supplier's actual bid or quote price.

Details regarding the implementation of the buyer's workbench and marketplace are as follows.

Workflow Management

NCC_WORKFLOW is a file of "Things to Do" lists. These lists are used by the system to keep the buyer informed of actions that need to be taken, and to provide for the rapid retrieval of information as requested by the marketplace.

The following lists may be maintained in the NCC_WORKFLOW file:

| List Name | Description |
| --- | --- |
| SRFPC*Buyer Code | Supplier Requests for Profile Change for Buyer Code. |
| SRFI*Buyer Code | Supplier Request for Information for Buyer Code. |
| POREQ*Whse*Type | Open Requisitions for Whse (Division) and Type (MP, PP, OL) |
| RFQ.OPEN.B*Buyer | RFQ's Out for Bid for Buyer. |
| RFQ.OPEN.S*Supplier | RFQ's Out for Bid for Supplier. |
| RFQ.PENDING*Buyer | RFQ's Pending Award for Buyer. |
| RFQ.SAMPLES | RFQ's to be Displayed as Samples for the marketplace. |
| PO.OPEN*Buyer | Open Purchase Orders for Buyer. |

The following processes maintain these lists:

| Process Name | List Name | Description |
| --- | --- | --- |
| marketplace | SRFPC, SRFI | Supplier requests |
| marketplace | RFQ.OPENx | Bids Received/Auction Closed |
| marketplace | RFQ.PENDING | Bids Received/Auction Closed |
| Ncc_PoRelease | ALL | Option to regenerate all lists |
| Ncc_PoRelease | SRFPC, SRFI | Supplier requests resolved |
| Ncc_PoRelease | POREQ | Requisitions re-opened |
| Ncc_PoRelease | RFQ.OPENx | RFQ created or closed, Manual Bid Posted |
| Ncc_PoRelease | RFQ.PENDING | Manual Bid Posted |
| Ncc_PoRelease | RFQ.SAMPLE | Sample RFQ created or deleted |
| Ncc_PartsList | POREQ | Requisitions created or updated |
| NCC$POREQFILE | POREQ | Requisitions created or cancelled |
| NCC$POFILE | PO.OPEN | PO's created or cancelled |
| NCC$POFILE | POREQ | Requisitions filled or re-opened. |
| S$RECEIVE | PO.OPEN | Purchase Order Receipts |

System Administration

The marketplace administration (Ncc_eMarketAdmin) application supports various tasks required for the ongoing administration of the marketplace web site. This may be a stand-alone program.

Supplier Login Administration

This view is used to assign Login Names for current and potential suppliers who wish to access the marketplace. Information includes:

Login Name

Company Name

Password

Security Level

ERP System Vendor Code

Buyer Notes

Documents

This view is used to create a master list of legal agreements and other informative documents. This list is displayed on the "Documents" page of the marketplace web site where the supplier may view and/or download these files. The list of legal documents is also displayed on the supplier maintenance screen of Ncc_PoRelease allowing the buyer to keep track of which agreements have been signed for each supplier.

| | Description | PDF Name | Legal/Info |
| --- | --- | --- | --- |
| 1 | Confidentiality | CONF.PDF | Legal |
| 2 | Safety Sign-Off | SAFE.PDF | Legal |
| 3 | History of Company | HISTORY.PDF | Info |

General Announcements

This option allows for the entry of free-form text to be displayed on the Main Menu of the web site. Each announcement may be addressed to: All suppliers, candidates only (level 3 and below), qualified suppliers only (level 4 and above), or selected suppliers. Optionally, each announcement may have an expiration date. The message will no longer be displayed once the expiration date has passed. The Ncc_eMarketAdmin procedure includes an option to purge expired messages.

Delivery Performance Sliding Scale

Web Site File Locations (UNC)

Pathnames to folders on the web server to store various files including:

Drawings and other attachments

Purchase Orders (Acrobat files)

Legal & Informative Documents

General Announcements and Other Web Site Text

Other Parameters

Default Bid Increment (for auctions)

Default Blackout Period

Buyer's Workbench Administration (Ncc_PoSetup)

This application may be a stand-alone program.

Buyer Code Definition

Buyer codes are assigned to suppliers, requisitions, RFQs, and purchase orders to aid in workflow management. Information is stored in a NCC_BUYER file in the ERP system.

File and Field Definitions

This section describes files that support the various functions of the marketplace.

ELF.TABLE File—NCC_PO

The ELF.TABLE file is centrally located in the MRPISYS account. The Ncc_PoSetup program updates a record called "NCC_PO" in this file with various system wide parameters governing the operation of this module.

| # | Display Name | Fmt | S/M | Description |
| --- | --- | --- | --- | --- |
| 4. | Category Code | 4L | M | List of valid Part Category Codes |
| 5. | Category Desc's | 25L | M | Descriptions associated with each Category Code |
| 6. | Buyer Id's | 6L | M | Unique identifier for each Buyer. |
| 7. | Buyer Names | 25L | M | Name of each Buyer |
| 8. | Email Address | 30L | M | Buyer's E-mail address. |
| 9. | Buyer's Login | 15L | M | This allows the system to automatically assume the Buyer Code based on the user's login identifier. |

NCC_EMKT_ADMIN File—System Administration

This file is centrally located on the MRPISYS account.

| # | Display Name | Fmt | S/M | Description |
|---|---|---|---|---|
| 0. | Login Name | 15L | S | Identifier used to access the marketplace |
| 1. | Password | 15L | S | Password used to access the marketplace |
| 2. | Company Name | 25L | S | |
| 3. | Contact Name | 25L | S | |
| 4. | Phone Number | 15L | S | |
| 5. | Vendor Code | 6L | S | Must be assigned for Level 4 and above |
| 6. | Buyer | 6L | S | The identifier of the Buyer who has primary responsibility for this supplier. Buyer codes are defined using Ncc_PoSetup. |
| 7. | Security Level | 1L | S | 1, 2, 3, 4, 5, or 6 |
| 8. | Buyer Notes | 25L | M | Notes explaining if/why Supplier not accepted |

NCC_EMKT_MSGS File—Messages to Display on Web Site

This file is used to store messages that will be displayed on the Main Menu of the marketplace web site. Announcements may updated using either Ncc_eMarketAdmin or Ncc_PoRelease.

| # | Display Name | Fmt | S/M | Description |
|---|---|---|---|---|
| 0. | Message Number | 6R | S | System assigned sequential record identifier. |
| 1. | Applies To | L | S | A = All Suppliers<br>C = Candidates Only (level 3 and below)<br>Q = Qualified Suppliers Only (level 4 and above)<br>S = Selected Supplier Codes. |
| 2. | Supplier Id's | 6L | M | List of Manfact Supplier Codes |
| 3. | Expiration Date | 8R | S | After this date, message will no longer be displayed. |
| 4. | Message Text | 25L | M | Free form text field. |

NCC_PO File—Purchase Orders

This file is used to store purchase order information not otherwise available in the ERP PO file. This file is created and maintained by the Ncc_PoRelease application.

| # | Display Name | Fmt | S/M | Description |
|---|---|---|---|---|
| 0. | PO Number | 6L | S | Purchase Order Number |
| 1. | Email Address | 30L | S | E-Mail Address used for PO transmission. |
| 2. | Email Subject | 50L | S | Subject used for PO transmission. |
| 3. | Email Message | 50L | S | Message used for PO transmission. |
| 4. | E-Mail Attachment | 50L | M | List of attachments included in PO transmission. |
| 5. | Stamp | 15L | S | Last Update By: Date*Login Name*Procedure*Time |
| 6. | Drawing Files | 50L | M | The Buyer may browse the network to identify Drawing files to accompany this part on the PO. |
| 7. | Date E-Mailed | 8R | S | Date PO was e-mailed to supplier |
| 8. | Time E-Mailed | 8R | S | Time PO was e-mailed to supplier |
| 9. | Date Viewed | 8R | S | The marketplace posts date Supplier viewed PO |
| 10. | Time Viewed | 8R | S | The marketplace posts time when Supplier viewed PO |

NCC_POREQ File—Purchase Requisitions

This file is used to store purchase requisition information not otherwise available in the ERP POREQ file. This file is created and maintained by the Ncc_PoRelease application.

| # | Display Name | Fmt | S/M | Description |
|---|---|---|---|---|
| 0. | Poreq Id | 6L | S | Requisition Number. |
| 18. | Stamp | 15L | S | Last Update By: Date*Login Name*Procedure*Time |
| 19. | Email Date | 8L | S | Date E-mail was generated notifying Requestor that PO was placed. |
| 20. | RFQ Number | 6L | S | The system updates this field with the Identifier of the RFQ this requisition was assigned to (see NCC_RFQ_LI file). |
| 21. | RFQ Line Number | 3R | S | The system updates this field with the line number of the RFQ this requisition was assigned to. |
| 22. | Drawing Files | 50L | M | The Buyer may browse the network to identify Drawing files to accompany this part on the RFQ and PO. |
| 23. | Hold Code | 1L | S | Check this box to put this Requisition on Hold. |

NCC_RFQ—Request for Quote (Header)

| # | Display Name | Fmt | S/M | Description |
|---|---|---|---|---|
| 0. | RFQ Number | 6L | S | System assigned Request for Quote number. |
| 1. | Description | 25L | M | A description of this RFQ |
| 2. | Stamp | 15L | S | Last Update By: Date*Login Name*Procedure*Time |
| 3. | Buyer Code | 6L | S | Identifier of Buyer responsible for this RFQ |
| 4. | Line Item Count | 3R | S | Number of Line Items on the RFQ. |
| 5. | Supplier Id's | 6L | M | List of Suppliers invited to bid. (see NCC_RFQBID file). |
| 6. | RFQ Type | 1L | S | A = Auction, S = Sealed Bid, M = Manual |
| 7. | RFQ Status | 1L | S | N = New, O = Open for Bid, P = Pending Award, C = Closed |
| 8. | Special Instructions | 25L | M | Notes to be displayed on the web site. |
| 9. | Duration | 5R | S | Length of time bidding is to remain open (HH:MM) |
| 10. | Open Date | 8R | S | Date this RFQ opened for bidding |
| 11. | Open Time | 8R | S | Time this RFQ opened for bidding (HH:MM:SS) |
| 12. | Close Date | 8R | S | Date this RFQ is scheduled to be closed for bidding |
| 13. | Close Time | 8R | S | Time when bidding is scheduled to close (HH:MM:SS) |
| 14. | Blackout Period | 6R | S | Expressed in Hours (for auctions). |
| 15. | Bid Increment | 6R | S | Minimum allowable bid increment (for auctions). |
| 16. | Current Best Bid | 12R | S | Lowest current bid while an auction is active. |

NCC_RFQLI—Request for Quote (Line Items) (continued)

| # | Display Name | Fmt | S/M | Description |
|---|---|---|---|---|
| 17. | Part Categories | 10L | M | A list of unique Part Category codes included in the RFQ. This is used to speed queries that filter RFQ's by Part Category (system maintained). |

NCC_RFQLI—Request for Quote (Line Items)

| # | Display Name | Fmt | S/M | Description |
|---|---|---|---|---|
| 0. | RFQ Number * Li# | 10L | S | System assigned RFQ number and Line Item Number. |
| 1. | POREQ Id | 6R | S | Purchase Requisition number |
| 2. | POREQ Li# | 3R | S | Purchase Requisition line number (5.8 compatibility) |
| 3. | Part Number | 20L | S | Must exist on PARTS file |
| 4. | Description | 25L | M | Vendor Description |
| 5. | Part Revision | 2L | S | Part Revision Level |
| 6. | Requested Date | 8R | S | Requested Delivery Date |
| 7. | Request Qty | 6R | S | Order Quantity |
| 8. | Unit of Measure | 2L | S | Request quantity is per this unit of measure |
| 9. | U/M Factor | 10R | S | Unit of Measure conversion factor |
| 10. | Part Type | 2L | S | MP, PP, or OL |
| 11. | Part Category | 10L | S | As defined in Ncc_PartsListCodes |
| 12 | Order Type | 1L | S | 1 = Inventory, 2 = Expense, 3 = Capital, 4 = Work Order, 5 = Direct Ship, 6 = Drop Ship, 7 = Work Order without Part Number, 8 = Outside Process |
| 13. | Warehouse Code | 6L | S | Delivery Location |
| 14. | Project Number | 25L | S | Must exist on the PROJECT file. |
| 15. | Work Order # | 6L | S | Job Number must exist on WO file. |
| 16. | Inventory Location | 6L | S | Manfact INVLOC identifier |
| 17. | G/L Account | 20L | S | Expense or Capital account number |
| 18 | Requestor | 15L | S | Name of person who requested quote |
| 19. | AML | 30L | M | Approved Manufacturers List |
| 20. | Material Supplied? | 1L | S | Y = Material to be furnished to supplier |
| 21. | Material Furnished | 27L | M | List of Parts to Supply (Part#*Qty) |
| 22. | OP Location | 6L | S | Outside Processing Inventory Location |
| 23. | Drawing Files | 50L | M | The Buyer may browse the network to identify Drawing files to accompany this part on the RFQ and PO. |

NCC_RFQBID—RFQ Supplier Bid (Header)

| # | Display Name | Fmt | S/M | Description |
|---|---|---|---|---|
| 0. | RFQ#*Supplier_Id | 10L | S | The RFQ Number and Supplier who submitted the bid. |
| 1. | Total Bid Amount | 12R | S | Total extended amount for all line items. |
| 2. | Submit Date | 8R | S | Date bid was submitted |
| 3. | Submit Time | 8R | S | Time bid was submitted (HH:MM:SS) |
| 4. | Submit Method | 1L | S | E = marketplace, B = Buyer Entered |
| 5. | Date Viewed | 8R | S | The marketplace posts date Supplier viewed RFQ |
| 6. | Time Viewed | 8R | S | The marketplace posts time when Supplier viewed RFQ |
| 7. | Q&D Rating | 6R | M | The Supplier's combined Quality and Delivery rating at time of bid selection. |
| 8. | Weighted Quote | 12R | M | Total Bid Amount/Q&D Rating |
| 9. | Line Count | 3R | S | Number of Line Items in the RFQBIDLI file. |

NCC_RFQBIDLI—RFQ Supplier Bid (Line Items)

| # | Display Name | Fmt | S/M | Description |
|---|---|---|---|---|
| 0. | RFQ#*SuppId*Li# | 10L | S | RFQ#, Supplier Identifier, and RFQ Line Number. |
| 2. | Unit Price | 12R | S | Bid amount for this line item. |
| 3. | Promise Date | 8R | S | Date supplier promises delivery of this item. |
| 4. | Contract Price? | 1L | S | If a Contract Price is in effect, Ncc_PoRelease will update this record with the Unit Price when the RFQ is created In this case, Supplier enters only the Promise Date. |

NCC_SRFI—Supplier Request for Information

| # | Display Name | Fmt | S/M | Description |
|---|---|---|---|---|
| 0. | Request Number | 6R | S | System assigned sequential record identifier. |
| 1. | Supplier Login | 15L | S | Id assigned to this Supplier to gain access to the web site. |
| 2. | Manfact Supplier Id | 6L | S | Identifier of the Manfact VENDOR file. |
| 3. | Request Date | 8R | S | Date information was requested. |
| 4. | RFQ Number | 6R | S | Identifier of the RFQ this request pertains to. |
| 5. | Question | 25L | M | Question asked by Supplier |
| 6. | Answer | 25L | M | Answer provided by Buyer |
| 7. | Answer By | 6L | S | Identifier of Buyer who answered question |
| 8. | Answer Date | 8R | S | Date question was answered |
| 9. | Post as Public? | 1L | S | Y = Answer posted to marketplace for all suppliers to view. |

NCC_SRFPC—Supplier Request for Profile Change

| # | Display Name | Fmt | S/M | Description |
|---|---|---|---|---|
| 0. | Request Number | 6R | S | System assigned sequential record identifier. |
| 1. | Supplier Login | 15L | S | Id assigned to this Supplier to gain access to the web site. |
| 2. | Manfact Supplier Id | 6L | S | Identifier of the Manfact VENDOR file. |
| 3. | Request Date | 8R | S | Date information was requested. |
| 4. | Status | 1L | S | O = Open, C = Closed, D = Denied |
| 5. | Company Name | 25L | S | Name of Supplier |
| 6. | Company Desc. | 25L | S | Description of Supplier's business. |
| 7. | Address | 24L | M | Full address (including city, state, zip) |
| 8. | City | 20L | S | |

-continued

| # Display Name | Fmt | S/M | Description |
|---|---|---|---|
| 9. State | 2L | S | |
| 10. Zip Code | 12L | S | |
| 11. Contact Name | 12L | S | Name of Purchasing contact person |
| 12. Contact Title | 12L | S | Purchasing contact person's title |
| 13. Contact Phone# | 12L | S | Purchasing contact Phone number |
| 14. Alternate Phone# | 12L | S | Purchasing contact alternate phone number (e.g., Cell) |
| 15. Fax Number | 12L | S | Purchasing Fax phone number |
| 16. Email Address | 30L | S | For PO transmission, RFQ notices, etc. |
| 17. P.O. Transmit Via | 1L | S | Preferred method: E = Email, P = Postal, F = Fax, W = Web |
| 18. RFQ Transmit Via | 1L | S | Preferred method: E = Email, P = Postal, F = Fax, W = Web |
| 19. Win/Loss Notice | 1L | S | Preferred method: E = Email, P = Postal, F = Fax, W = Web |
| 20. SQUARE FEET | 7R | S | Square footage of Supplier's facility (optional) |
| 21. PUBLIC COMPANY? | 1L | S | Y/N |
| 22. UNION SHOP? | 1L | S | Y/N |
| 23. ANNUAL SALES | 12R | S | Supplier's estimated annual sales (optional) |
| 24. EQUIPMENT | 25L | M | Description of available equipment and/or products |

NCC_SUPPLIER—Supplier Information

This file is used to store information about each supplier that is not otherwise available in the ERP VENDOR file. This file is created and maintained by the Ncc_PoRelease application.

| # Display Name | Fmt | S/M | Description |
|---|---|---|---|
| 0. Supplier Id | 6L | S | Unique identifier for each supplier. |
| 1. Email Address | 30L | S | Last E-Mail Addressed used for PO transmission. |
| 2. Email Subject | 50L | S | Last Subject used for PO transmission. |
| 3. Email Message | 50L | S | Last Message used for PO transmission. |
| 4. Stamp | 15L | S | Last Update By: Date*Login Name*Procedure*Time |
| 5. Categories | 10L | M | List of Approved Part Categories for this Supplier. |
| 6. P.O. Transmit Via | 1L | S | Preferred method: E = Email, P = Postal, F = Fax, W = Web |
| 7. RFQ Transmit Via | 1L | S | Preferred method: E = Email, P = Postal, F = Fax, W = Web |
| 8. Win/Loss Notice | 1L | S | Preferred method: E = Email, P = Postal, F = Fax, W = Web |
| 9. COMPANY DESC. | 25L | S | Description of Supplier's business. |
| 10. SQUARE FEET | 7R | S | Square footage of Supplier's facility (optional) |
| 11. PUBLIC COMPANY? | 1L | S | Y/N |
| 12. UNION SHOP? | 1L | S | Y/N |
| 13. ANNUAL SALES | 12R | S | Supplier's estimated annual sales (optional) |
| 14. EQUIPMENT | 25L | M | Description of available equipment and/or products |
| 15. REMIT-TO ONLY DATASET. | 1L | S | Y = Not a Purchasing Supplier |
| 20. Note Line# | 3R | M | Sequential line item identifier |
| 21. Note Entry Date | 8R | M | Date each note entered |
| 22. Note Entered By | 6L | M | Buyer Code |
| 23. Note Expires Date | 8R | M | Date each note expires (optional) |
| 24. Note Text DATASET2: | 25L | SV | Free form text field |
| 25. Document Line# | 3R | M | Sequential line item identifier |
| 26. Doc. File Name | 25L | M | PDF File Name of Document |
| 27. Doc. Required? | 1L | M | Y = Supplier is required to sign this document. |
| 28. Doc. Date Signed | 8R | M | Date Supplier signed this document. |
| 29. Doc. Verified By DATASET3: | 6L | M | Buyer Code |
| 30. Contact Line# | 3R | M | Sequential line item identifier |
| 31. Contact Name | 15L | M | Other contacts at this company. |
| 32. Contact Title | 15L | M | Title of each contact. |
| 33. Contact Phone | 15L | M | Phone Number of each Contact |
| 34. Contact Extension | 5L | M | Phone extension of each Contact |
| 35. Contact Fax | 25L | M | Fax Number for each Contact |
| 36. Contact E-Mail | 25L | M | E-Mail Address for each Contact |
| 37. Contact Notes | 25L | M | Other information for each Contact |

NCC_WORKFLOW—Buyer's Workflow Item Counts

This file is used to keep lists of record identifiers for efficient processing of workflow information.

| # Display Name | Fmt | S/M | Description |
|---|---|---|---|
| 0. List Name | 25L | S | Unique identifier for each list (see below). |
| 1. List Count | 6R | S | Number of items in this list. |
| 2. Record Id's | 15L | M | List of record identifiers awaiting processing. |

PARTS—Parts Master

The following fields are in the Vendor dataset of the PARTS file.

| # Display Name | Fmt | S/M | Description |
|---|---|---|---|
| 0. Part Number | 20L | S | Record identifier |
| 40. Vendor Number | 6L | M | Dataset identifier (existing field) |
| Contract Price*Qty | 12R | M | Contract Price for this Part and Vendor. Optionally, multiple prices may be entered with the required minimum order quantity associated with each price. |
| Expiration Date | 8R | M | The date this contract expires. |

The present invention facilitates communications between buyers and manufacturing divisions that have a need for engineered-to-order products and between buyers and suppliers that can deliver products that meet the needs of the manufacturing divisions. Buyers are provided with the tools they need to manage the workflow related to purchasing. RFQs are submitted to a web-based marketplace so that the company benefits from the pricing that results in a competitive market. Suppliers benefit because they may learn easily and efficiently about orders that they may fulfill. Access to performance data that is tracked by the company allows suppliers to identify opportunities for improvement and to improve their own operations.

While example embodiments of the invention have been illustrated and described, various modifications and combinations can be made without departing from the spirit and scope of the invention. Although the present invention is described in relation to an example embodiment for engineered-to-order products, procurement of any type of product may be managed using the present invention. Modifications, combinations, and equivalents to the system and method of the present invention are intended to be covered and claimed.

What is claimed is:

1. A computerized method for procuring an engineered-to-order product for a manufacturing company comprising:
    (a) receiving at a purchasing department for said manufacturing company, an approved design for a product, said approved design from an engineering department of said manufacturing company for an engineered-to-order product;
    (b) creating from said approved design a purchase order requisition for said product, said purchase order requisition created by a buyer in said purchasing department;
    (c) creating a request for quotation based on said purchase order requisition;
    (d) submitting said request for quotation to an online marketplace to which a plurality of suppliers have access;
    (e) receiving at least one question from at least one of said plurality of suppliers regarding said request for quotation;
    (f) revising said request for quotation at said online marketplace according to said at least one question from said at least one of said plurality of suppliers, said revision to said request for quotation available to all of said plurality of suppliers;
    (g) receiving a plurality of conforming quotes from a plurality of said plurality of suppliers, said conforming quotes meeting criteria in said request for quotation and comprising a quote price;
    (h) receiving at least one non-conforming quote from at least one supplier, wherein said non-conforming quote does not meet criteria in said request for quotation and comprises a quote price;
    (i) submitting from said purchasing department to said engineering department for approval said non-conforming quote received from said at least one supplier;
    (j) receiving from said engineering department an approval for said non-conforming quote;
    (k) computing for said conforming quotes and said approved non-conforming quote a weighted cost based on said quote price in each of said conforming and non-conforming quotes wherein said weighted cost is determined using a composite rating that combines quality and delivery ratings for the supplier submitting the quote; and
    (l) awarding a purchase order to one of said plurality of suppliers wherein said buyer awards said purchase order according to a lowest weighted cost of said weighted costs for said plurality of conforming quotes and said approved non-conforming quote.

2. The method of claim 1 wherein said quality and delivery ratings are obtained from an ERP system.

3. The method of claim 1 wherein each of said quotes further comprises a delivery date.

4. The method of claim 3 wherein said request for quotation includes a drawing of said engineered-to-order product.

5. The method of claim 1 wherein said request for quotation is selected from the group consisting of sealed bids, auction bids, and direct/sole source jobs.

6. A computerized system for procuring an engineered-to-order product for a manufacturing company comprising:
    a purchasing department computer for receiving electronic files for an approved design for an engineered-to-order product, said electronic files for said approved design received from an engineering department computer of said manufacturing company;
    a server equipped with one or more software applications to permit a buyer at said manufacturing company using a client application to:
    (a) create from said electronic files for an approved design a purchase order requisition for said product;
    (b) create a request for quotation based on said purchase order requisition;
    (c) submit said request for quotation to an online marketplace to which a plurality of suppliers have access;
    (d) receive at least one question from at least one of said plurality of suppliers regarding said request for quotation;
    (e) update said request for quotation at said online marketplace according to said at least one question from said at least one of said plurality of suppliers wherein said update to said request for quotation is available to all of said plurality of suppliers;
    (f) receive conforming quotes from a plurality of said plurality of suppliers, said conforming quotes meeting criteria in said request for quotation and comprising a quote price;
    (g) receive at least one non-conforming quote from at least one supplier, wherein said non-conforming quote does not meet criteria in said request for quotation and comprises a quote price;
    (h) submit to said engineering department for approval said non-conforming quote received from said at least one supplier;
    (i) receive from said engineering department an approval for said non-conforming quote;
    (j) compute for conforming quotes and said approved non-conforming quote a weighted cost based on said quote price in each of said quotes wherein said weighted cost is determined using a composite rating that combines quality and delivery ratings for the supplier submitting the quote; and
    (k) award a purchase order to one of said plurality of suppliers wherein said buyer awards said purchase order according to said weighted costs for said plurality of conforming quotes and said approved non-conforming quote.

7. The system of claim 6 wherein said quality and delivery ratings are obtained from an ERP system.

8. The system of claim 6 wherein each of said quotes further comprises a delivery date.

9. The system of claim 6 wherein said request for quotation includes a drawing of said engineered-to-order product.

10. The system of claim 6 wherein said marketplace is adapted to support sealed bids, auction bids, and direct/sole source jobs.

11. A computerized method for procuring engineered-to-order products for a manufacturing company comprising:
    (a) receiving at a purchasing department for said manufacturing company approved designs for products, said approved designs from an engineering department of said manufacturing company for engineered-to-order products;
    (b) creating from said approved designs purchase order requisitions for said product, said purchase order requisitions created by a buyer in said purchasing department;

(c) creating requests for quotation based on said purchase order requisitions;

(d) submitting a plurality of said requests for quotation to an online marketplace to which a plurality of suppliers have access;

(e) receiving a plurality of quotes from said plurality of suppliers responsive to at least one of said plurality of requests for quotation, said quotes comprising conforming quotes meeting criteria in said at least one request for quotation and at least one non-conforming quote not meeting criteria in said at least one request for quotation and each of said quotes comprising a quote price;

(f) receiving from said engineering department approval for said at least one non-conforming quote;

(g) computing for each of said plurality of suppliers a quality rating, said quality rating for each supplier based on historical product quality data for said supplier;

(h) computing for each of said plurality of suppliers a delivery rating, said delivery rating for each supplier based on historical timeliness of deliveries from said supplier;

(i) computing for each of said plurality of suppliers a composite supplier rating based on a combination of said quality rating and delivery rating for each supplier;

(j) computing for each quote price of said conforming quotes and said approved non-conforming quote a weighted quote price wherein said weighted quote price is based on a combination of said quote price and said composite supplier rating for said supplier providing said quote price;

(k) comparing said weighted quote prices to determine a lowest weighted quote price; and (l) awarding a purchase order to one of said plurality of suppliers with said lowest weighted quote price.

12. The method of claim 11 wherein said quality and delivery ratings are obtained from an ERP system.

13. The method of claim 11 wherein at least one of said requests for quotation includes a drawing of said engineered-to-order product.

14. The method of claim 11 wherein said requests for quotation are selected from the group consisting of sealed bids and auction bids.

* * * * *